US011065489B2

(12) United States Patent
Coletta et al.

(10) Patent No.: US 11,065,489 B2
(45) Date of Patent: Jul. 20, 2021

(54) FIRE PROTECTION SPRINKLER ASSEMBLIES AND INSTALLATIONS WITH ADJUSTABLE PUSH-TO-CONNECT FITTINGS

(71) Applicant: Tyco Fire Products LP, Lansdale, PA (US)

(72) Inventors: George B. Coletta, West Warwick, RI (US); Robert Kyle Fullerton, Matthews, NC (US); Scott Alan Going, Lubbock, TX (US); Michael W. Horgan, Cranston, RI (US); Alaine Christine Liotta, Conshohocken, PA (US); Gary James Luiz, Warwick, RI (US); Todd F. Orsini, Cranston, RI (US); Darren Palmieri, Cranston, RI (US); Dennis Michael Phillips, Mount Juliet, TN (US); Kevin Wade Pressnell, Athens, AL (US); Manuel R. Silva, Jr., Cranston, RI (US)

(73) Assignee: Tyco Fire Products LP, Lansdale, PA (US)

( * ) Notice: Subject to any disclaimer, the term of this patent is extended or adjusted under 35 U.S.C. 154(b) by 203 days.

(21) Appl. No.: 16/470,799

(22) PCT Filed: Dec. 22, 2017

(86) PCT No.: PCT/US2017/068210
§ 371 (c)(1),
(2) Date: Jun. 18, 2019

(87) PCT Pub. No.: WO2018/125804
PCT Pub. Date: Jul. 5, 2018

(65) Prior Publication Data
US 2019/0374802 A1    Dec. 12, 2019

Related U.S. Application Data

(60) Provisional application No. 62/439,725, filed on Dec. 28, 2016, provisional application No. 62/439,665, (Continued)

(51) Int. Cl.
*A62C 37/09* (2006.01)
*F16L 37/091* (2006.01)
*A62C 35/68* (2006.01)

(52) U.S. Cl.
CPC .......... *A62C 37/09* (2013.01); *F16L 37/0915* (2016.05); *A62C 35/68* (2013.01)

(58) Field of Classification Search
CPC ....... A62C 37/09; A62C 35/68; F16L 37/0915
(Continued)

(56) References Cited

U.S. PATENT DOCUMENTS

| 3,815,821 A | 6/1974 | Metcalfe |
| 4,019,582 A | 4/1977 | Gangell |

(Continued)

OTHER PUBLICATIONS

International Search Report and Written Opinion for International Application No. PCT/US2017/068210, dated Apr. 24, 2018, 12 pages.
(Continued)

*Primary Examiner* — Christopher S Kim
(74) *Attorney, Agent, or Firm* — Foley & Lardner LLP

(57) ABSTRACT

Adjustable fire protection assemblies and methods are provided. The assembly includes a sprinkler having a body with an outer encasing surface and a deflector supported from the body. An escutcheon having a receiver and a rim surround the fire protection sprinkler to define an aperture between the receiver and the sprinkler. A push-to-connect fitting of the assembly includes a tubular member with an end for connection to a pipe and an internal conduit that receives the
(Continued)

sprinkler body. A seal member and a retaining ring are disposed within the tubular member to form an adjustable seal and grip about the sprinkler body. A releasing member translates to disengage the retaining ring from the sprinkler body; and the escutcheon translates with respect to the tubular member in a sliding surface engagement to define an adjustable deflector-to-rim distance between the rim of the escutcheon and the deflector of the sprinkler.

19 Claims, 11 Drawing Sheets

Related U.S. Application Data filed on Dec. 28, 2016, provisional application No. 62/439,617, filed on Dec. 28, 2016, provisional application No. 62/439,744, filed on Dec. 28, 2016, provisional application No. 62/439,689, filed on Dec. 28, 2016, provisional application No. 62/439,632, filed on Dec. 28, 2016, provisional application No. 62/439,701, filed on Dec. 28, 2016.

(58) Field of Classification Search
USPC ............................................... 169/37–41, 90
See application file for complete search history.

(56) References Cited

U.S. PATENT DOCUMENTS

| | | | |
|---|---|---|---|
| 6,533,041 B1 | 3/2003 | Jensen | |
| 6,536,534 B1* | 3/2003 | Sundholm | A62C 35/68 169/37 |
| 7,222,678 B2* | 5/2007 | Shim | A62C 37/09 169/37 |
| 8,448,714 B2* | 5/2013 | Park | A62C 37/12 169/37 |
| 2011/0214886 A1 | 9/2011 | Orr | |
| 2014/0097274 A1 | 4/2014 | Smyrl | |
| 2015/0083442 A1* | 3/2015 | Koiwa | A62C 35/68 169/37 |
| 2015/0345683 A1 | 12/2015 | Crompton et al. | |
| 2016/0023030 A1* | 1/2016 | Beagen | A62C 37/12 169/40 |
| 2019/0374802 A1* | 12/2019 | Coletta | A62C 37/09 |
| 2020/0330807 A1* | 10/2020 | Silva, Jr. | B05B 15/65 |
| 2021/0003239 A1* | 1/2021 | Liang | F16L 37/0915 |
| 2021/0031064 A1* | 2/2021 | Silva, Jr. | A62C 37/11 |
| 2021/0033231 A1* | 2/2021 | Silva, Jr. | F16L 37/091 |

OTHER PUBLICATIONS

Tyco Fire Products LP, "Rapid Response Series LFII Residential 4.9 K-factor Pendent Sprinkler Wet Pipe and Dry Pipe Systems", Jan. 2016, 6 pages.

Tyco Fire Products LP, "Rapid Response Series LFII Residential Sprinklers 4.9 K-factor Flat-Plate Concealed Pendent Wet Pipe and Dry Pipe Systems", Jan. 2016, 6 pages.

Tyco Fire Products LP, "Series RFII—5.6 K-factor 'Royal Flush II' Concealed Pendent Sprinklers Quick & Standard Response, Standard Coverage", Mar. 2013, 4 pages.

Tyco Fire Products LP, "Series TY-B—2.8, 5.6, and 8.0 K-factor Upright, Pendent, and Recessed Pendent Sprinklers Standard Response, Standard Coverage", Nov. 2014, 8 pages.

\* cited by examiner

FIRE PROTECTION SPRINKLER ASSEMBLIES AND INSTALLATIONS WITH ADJUSTABLE PUSH-TO-CONNECT FITTINGS

PRIORITY CLAIM & INCORPORATION BY REFERENCE

The application is an international application claiming priority to: U.S. Provisional Patent Application No. 62/439,617, filed on Dec. 28, 2016, U.S. Provisional Patent Application No. 62/439,632, filed on Dec. 28, 2016, U.S. Provisional Patent Application No. 62/439,665, filed on Dec. 28, 2016, U.S. Provisional Patent Application No. 62/439,689, filed on Dec. 28, 2016, U.S. Provisional Patent Application No. 62/439,701, filed on Dec. 2.8, 2016, U.S. Provisional Patent Application No. 62/439,725, filed on Dec. 28, 2016, and U.S. Provisional Patent Application No. 62/439,744, fled on Dec. 28, 2016, each of which is incorporated by reference in its entirety.

TECHNICAL FIELD

The present invention relates generally to fire protection devices and more specifically to adjustable fire protection sprinkler assemblies, pipe connections and installations.

BACKGROUND ART

Fire protection sprinklers can be utilized to protect various occupancies and commodities from fire. In certain occupancies, the area to be protected is surrounded by walls and ceilings. Typically, the fire protection sprinklers are located proximate the openings in the walls and ceiling. In preferred arrangements, a fire protection sprinkler assembly includes the fire protection sprinkler, a concealment member, such as an escutcheon and/or cover plate, and a support member, e.g. a support cup, secured to the fire protection sprinkler that positions the concealment member proximate the wall or ceiling. The wall and/or ceiling serves as a mounting surface for the concealment member. As such, the assembly provides for a decorative arrangement for the fire protection sprinkler exposed to the area to be protected.

Opposite the mounting surface and behind the wall or ceiling is a structure, such as structural framing, to which the wall or ceiling is mounted and supported. The framing and the areas between parallel walls or adjacent ceilings and floor decks define a confined space for the location of firefighting fluid supply piping for the fire protection sprinkler assembly. In order to secure the fire protection sprinkler assembly to the firefighting fluid supply piping, a piping component, such as a pipe fitting, is also located in the confined space. Generally, the pipe fitting is located within the confined space so that when the fire protection sprinkler is secured to the fitting, the sprinkler or a portion thereof is located within a prescribed distance from the mounting surface. The prescribed distance or clearance is the distance from the mounting surface needed for a fluid distribution portion of the sprinkler, typically a deflector, to be in an operative position to provide a desired fluid distribution pattern to effectively address a fire in the area and/or over a commodity in the area to be protected. Thus, in order to properly position the fire protection sprinkler assembly, users must configure the firefighting fluid supply piping and locate its fittings in the confined space to orient the fire protection sprinkler in its prescribed operative position relative to the mounting surface of the wall and/or ceiling.

A fire protection sprinkler of the assembly is typically provided with a externally threaded body that is received within a threaded portion of the pipe fitting. While the respective threaded portions allow for relative positional adjustment between the components, the amount of adjustability is minimal because the components need to be sufficiently threadedly engaged to ensure a fluid tight connection. Thus, locating the fire protection sprinkler at its prescribed operative distance or position is dependent on the ability of the user to locate the supply piping and fitting in the confined space in an appropriate location. With a pipe fitting in the confined space, behind walls, above ceilings or obscured by other structures, securing and/or removing the threaded member of the fire protection sprinkler to and from the thread portion of the pipe fitting rewires special tools and operator dexterity.

With the fire protection sprinkler secured to the firefighting fluid supply piping via the fitting, a support member retained on the fire protection sprinkler can be used to secure and support a concealment member of the fire protection sprinkler assembly. The presence of the support member can increase the complexity of threading the fire protection sprinkler to the fitting that is located within the confined space. In some instances removing and/or securing a threaded fire protection sprinkler, with or without the support structure, to a pipe fitting can, in some conditions, require removal of the wall and/or ceiling.

The fittings within the confined space that receive the sprinkler are typically connected to the fluid supply piping via various intermediate fittings. These intermediate fittings include and are not limited to, unions, tee fittings, elbow fittings or fitting of various angular configurations. The installation of certain known fire protection sprinklers in confined spaces with intermediate fittings using a threaded connection can be logistically challenging. To address this challenge, special intermediate fittings have been developed that include an integrated threaded sprinkler. Despite having the availability of a special intermediate fitting, securing a fire protection sprinkler to a threaded fitting in a confined space remains a challenge to properly position the special intermediate fitting to locate the fire protection sprinkler in its prescribed operative range relative to the mounting surface of the wall and/or ceiling. Examples of known threaded recessed and concealed sprinkler assemblies are shown in the following product data sheets from Tyco Fire Products, LP of Lansdale, Pa.: (i) TFP181: "Series RFII-5.6 K-factor 'Royal Flush II' Concealed Pendent Sprinklers Quick & Standard Response, Standard Coverage (March 2013); (ii) TFP151: "Series TY-B-2.8, 5.6, and 8.0 K-factor Upright, Pendent, and Recessed Pendent Sprinklers Standard Response, Standard Coverage (November 2014); (iii) TFP400: "RAPID RESPONSE Series LFII Residential 4.9 K-factor Pendent Sprinkler Wet Pipe and Dry Pipe Systems (January 2016); and (iv) TFP443: "RAPID RESPONSE Series LFII Residential Sprinklers 4.9 K-factor Flat-Plate Concealed Pendent Wet Pipe and Dry Pipe Systems" (January 2016).

Alternative non-threaded connection technology for securing a fire protection sprinkler to a fitting appropriate for confined spaces exist. Such alternative connectors are shown and described in U.S. Patent Application Publication No. 2011/0214886. Shown therein is a threadless sprinkler and fitting arrangement in which a sprinkler is pressed into a fitting to engage a fire suppressant or extinguishing supply pipe. The threadless fitting includes an internal engagement member having tabs or prongs that grip the outer surface of the sprinkler. An internally secured disengagement member can be slid relative to the engagement member to disengage the prongs from the body. Accordingly, U.S. Patent Application Publication No. 2011/0214886 shows and describes a threadless fitting arrangement for installing and removing a sprinkler. Although U.S. Patent Application Publication No. 2011/0214886 shows the sprinkler installation in or near a ceiling or sidewall, the patent publication does not expressly teach adjusting the sprinkler to locate the deflector at a prescribed or operative distance from the mounting surface. Instead, U.S. Patent Application Publication No. 2011/0214886 shows the sprinkler piping outlet near the wall or ceiling with the threadless fitting disposed or engaged with the sprinkler piping outlet. This at least suggests that for supply piping in confined areas, the location of the sprinkler with respect to the mounting surface of the wall or ceiling requires adjustment of the supply pipe and its outlet location near the wall or ceiling.

U.S. Patent Publication No. 2014/0097274 shows and describes sprinkler assemblies joined by push-connect and press-connect fittings in which sprinkler assemblies are joined to sprinkler pipes by either a push-connect or press-connect fitting without the use of heat or sealant. One disadvantage of the press-connect fitting is that it forms a permanent joint between the sprinkler assembly and the sprinkler system pipe and therefore does not provide for adjustment. The push-connect fitting allows for separation of the formed joint between the sprinkler assembly and the sprinkler pipe. However, in the case of a sprinkler assembly installation in which the sprinkler piping is in a confined space, the push-connect fitting taught in U.S. Patent Publication No. 2014/0097274 appears to require that the adjustment be made on the sprinkler piping side thereby making the location of the sprinkler deflector with respect to a mounting surface logistically difficult.

Other push fitting assemblies for joining and disjoining pipe elements are shown in U.S. Patent Publication No. 2015/0345683. However, the patent publication again does not teach or suggest the use of the fittings in the adjusted installation of sprinklers for connection to piping in confined spaces. Moreover, none of the known alternatives of the cited patent documents teach or address the needs of an adjustable recessed or concealed sprinkler installation from pipe fitting located in confined spaces.

DISCLOSURE OF INVENTION

Preferred fire protection sprinkler assemblies are provided with adjustable arrangements for connection to fluid supply pipes. The assemblies include preferred embodiments of a fire protection sprinkler and threadless push-to-connect fitting. The preferred embodiments include features that individually or in combination address logistical issues for connecting fire protection sprinklers to firefighting fluid supply piping located in the confined space behind ceilings or walls. Moreover, the preferred embodiments and methods described herein provide for fire protection sprinkler connections and assemblies that are particularly configured for recessed or concealed arrangements. Accordingly, the s preferred embodiments include assemblies and methods having a preferred fire protection sprinkler, a push-to-connect fitting, an escutcheon, a support cup, and/or a cover.

Preferred embodiments of a sprinkler assembly include a fire protection sprinkler having a body defining an inlet and an outlet with a passageway extending between the inlet and the outlet along a longitudinal axis. A deflector is supported by the body and spaced from the outlet. The body has an outer encasing surface surrounding at least a portion of the passageway to define a first contact zone. An escutcheon having a receiver and a rim surrounds the tire protection sprinkler to define an aperture between the receiver and the sprinkler. The receiver has a surface defining a second contact zone. A push-to-connect fitting of the assembly has an exterior surface and an inner surface. The push-to-connect fitting includes a tubular member with an end for connection to a pipe and an internal conduit that receives the body of the sprinkler. A seal member and a retaining ring are disposed within the internal conduit. The seal member forms a fluid tight seal about the first contact zone with the retaining ring engaged in a grip about the first contact zone to form an adjustable seal and grip about the body of the sprinkler outer encasing surface along the first contact zone. The second contact zone of the escutcheon translates with respect to the tubular member in a preferably sliding surface engagement to define an adjustable deflector-to-rim distance between the rim of the escutcheon and the deflector of the sprinkler. A preferred releasing member translates with respect to the tubular member to disengage the grip of the retaining ring about the first contact zone and allow the sprinkler body first contact zone to translate with a preferably engagement within the tubular member. Accordingly, preferred embodiments provide for sprinkler assemblies and installation with dual adjustment.

A preferred recessed sprinkler assembly includes a fire protection sprinkler having a body defining an inlet and an outlet with a passageway extending between the inlet and the outlet along a longitudinal axis. A deflector is supported by the body and spaced from the outlet. The body has an outer encasing surface surrounding at least a portion of the passageway. An escutcheon has a receiver and a rim with the receiver surrounding the fire protection sprinkler to define an annular aperture therebetween. A preferred push-to-connect fitting includes a tubular member having an internal conduit with the body of the sprinkler received in the internal conduit. A seal member and a retaining rink are disposed within the internal conduit. A releasing member is provided to disengage the grip of the retaining ring about the outer encasing surface of the body. The releasing member has a portion that radially traverses the aperture and contacts the receiver of the escutcheon.

Accordingly, a preferred embodiment of a recessed push-to-connect fitting is provided that includes an escutcheon having a receiver and a rim and a push-to-connect fitting having a tubular member with an end for connection to a pipe. The tubular member includes an exterior surface and an inner surface with the inner surface defining an internal conduit for receipt of a fire protection sprinkler. A seal member and a retaining ring are disposed within the internal conduit for forming a fluid tight sealing grip about the fire protection sprinkler. A releasing member that preferably translates with respect to the tubular member disengages the grip of the retaining ring about the fire protection sprinkler. The receiver of the escutcheon is supported about the releasing member to define an annular aperture between the tubular member and the receiver with the releasing member having a portion that preferably radially traverses the annular aperture.

In another embodiment of a preferred sprinkler assembly, a fire protection sprinkler has a body defining an inlet and an outlet with a passageway extending between the inlet and the outlet along a longitudinal axis. A deflector is supported by the body and spaced from the outlet. The body has an outer encasing surface surrounding at least a portion of the passageway. A preferred push-to-connect fitting includes a tubular member with an internal conduit that receives the body of the sprinkler. A seal member and a retaining ring are disposed within the internal conduit to form a fluid tight sealing grip about the encasing surface. A preferred releasing member translates with respect to the tubular member to disengage the grip of the retaining ring about the outer encasing surface of the body. The releasing member is preferably secured to the exterior surface of the tubular member in a preferred manner. In a preferred embodiment, the tubular member includes a first end and a second end with the second end including an annular flange formed about the second end of the fitting with a groove along the exterior surface of the annular flange. The releasing member preferably includes an annular projection engaged within the circumferential groove.

Preferred sprinkler assemblies include a fire protection sprinkler having a body defining an inlet and an outlet with a passageway extending between the inlet and the outlet along a longitudinal axis. A deflector is supported by the body and spaced from the outlet. The body has an outer encasing surface surrounding at least a portion of the passageway. A preferred push-to-connect fitting includes a tubular member with an exterior surface and an inner surface defining an internal conduit extending along a longitudinal axis with the sprinkler body located in the internal conduit. A seal member and a retaining ring are disposed within the internal conduit to form a fluid tight sealing grip about the outer encasing surface of the body. A releasing member is coupled to the tubular member and translates with respect to the tubular member to disengage the retaining ring grip about the encasing surface of the body. The preferred releasing member has an end face with a central opening axially aligned with the internal conduit with the sprinkler body. The end face is axially spaced from the seal member to define a mechanism length of the push-to-connect fitting. The ratio of mechanism length-to-minimum internal diameter of the retaining ring preferably ranges from 0.5:1-0.61. Alternatively or additionally, the ratio of mechanism length-to-overall axial height of the push-to-connect fitting is less than 0.4:1.

A preferred sprinkler assembly includes a push-to-connect fitting having a tubular member with an exterior surface and an inner surface defining an internal conduit extending along a longitudinal axis for receipt of a sprinkler body. A seal member and a retaining ring are disposed within the internal conduit; and a releasing member that translates with respect to the tubular member. A preferred fire protection sprinkler is inserted within the push-to-connect-fitting with a body received within the internal conduit of the tubular member. The sprinkler body defines a body length with an outer encasing surface extending axially over at least a portion of the body length. The seal member forms a fluid tight seal about the encasing surface and the retaining ring grips about the outer encasing surface of the body. The translation of the releasing member relative the tubular member disengages the grip of the retaining ring. The body has an inlet and an outlet with a passageway to define a nominal K-factor and K-factor-to-body length ratio ranging from 3.3:1 to 1.3:1. The fire protection sprinkler includes a deflector supported by the body and spaced from the outlet.

A preferred sprinkler assembly includes a fire protection sprinkler having a body defining an inlet and an outlet with a passageway extending between the inlet and the outlet along a longitudinal axis. A deflector is supported by the body and spaced from the outlet. The body has an outer encasing surface surrounding at least a portion of the passageway. A pipe fitting has a first pipe end for connection to a fluid supply pipe and at least a second pipe end with an internal flow path connecting the first and at least second pipe ends. Each of the first and at least second pipe ends have an internal surface and a shoulder circumscribing the flow path to define a receptacle at the pipe end having an insertion depth. A preferred insert push-to-connect fitting includes a tubular member with an exterior surface and an internal conduit that receives the body of the sprinkler. The tubular member has a securement portion with the exterior surface of the securement portion of the tubular member defining a constant diameter over an axial length at least equal to the insertion depth of the receptacles. The exterior surface of the securement portion is in contact with and affixed to the inner surface of the at least second receptacle of the pipe end. A seal member and a retaining ring are disposed within the internal conduit. The seal member forms a fluid tight seal about the encasing surface of the sprinkler body and the retaining ring is engaged in a grip about the outer encasing surface of the body. A releasing member translates with respect to the tubular member to disengage the retaining ring grip about the encasing surface of the body. Preferred embodiments of the push-to-connect fitting includes a resistance member to control the relative translation between the releasing member and the tubular member. The resistance member is preferably a resilient member. Alternatively, the resistance member can form a positive lock between the releasing member and the tubular member. Moreover, the preferred sealing member is an integral annular sealing member having a support base and at least two annular sealing surfaces axially spaced apart and integrated with the base to contact the encasing surface of the sprinkler body and form the fluid tight seal about the encasing surface.

Another preferred embodiment of a sprinkler assembly includes a fire protection sprinkler having a body defining an inlet and an outlet with an internal passageway extending along a longitudinal axis between the inlet and the outlet. The body includes an encasing surface about the internal passageway. A push-to-connect fitting includes a tubular member with an end for connection to a pipe. The tubular member includes an exterior surface and an inner surface with the inner surface defining an internal conduit that receives the body of the sprinkler. A seal member and a retaining ring are disposed within the internal conduit and the seal member forms a fluid tight seal about the encasing surface of the sprinkler body. The retaining ring is engaged in a grip about the outer encasing surface of the body. A releasing member translates with respect to the tubular member to disengage the grip of the retaining ring about the outer encasing surface of the body; and a resistance member controls the relative translation between the releasing member and the tubular member.

Another preferred embodiment of a sprinkler assembly includes a fire protection sprinkler having a body defining an inlet and an outlet with a passageway extending between the inlet and the outlet along a longitudinal axis. A deflector is supported by the body and spaced from the outlet. The body has an outer encasing surface surrounding at least a portion of the passageway. A push-to-connect fitting includes a tubular member with an exterior surface and an inner surface, the inner surface defines an internal conduit that receives the body of the sprinkler. A retaining ring is disposed within the conduit engaged in a grip about the outer encasing surface of the body. A preferred releasing member translates with respect to the exterior surface of the tubular member to disengage the retaining ring grip about the encasing surface of the body. An integral annular sealing member is disposed within the internal conduit to form a fluid tight seal about the encasing surface of the sprinkler body. The annular sealing member has a support base and at least two annular sealing surfaces axially spaced apart and integrated with the base to contact the encasing surface of the sprinkler body and form the fluid tight seal about the encasing surface.

A preferred embodiment of a concealed sprinkler assembly includes a fire protection sprinkler having a body defining an inlet and an outlet with a passageway extending between the inlet and the outlet. A deflector is supported by the body and spaced from the outlet. The body has an encasing surface surrounding at least a portion of the passageway. A support cup having a central hole with a plurality of openings is disposed over the sprinkler body such that the cup surrounds the sprinkler and an escutcheon, having a receiver, a rim, and a cover is engaged with the support cup to define a housing about the fire protection sprinkler such that the cover conceals the deflector. A preferred push-to-connect fitting includes a tubular member for connection to a pipe. The tubular member has an exterior surface and an inner surface. The inner surface defines an internal conduit with the body of the sprinkler received in the internal conduit. A seal member and a retaining ring are disposed within the internal conduit. The fitting includes a releasing member which translates with respect to the tubular member to disengage the grip of the retaining ring about the outer encasing surface of the body. The preferred releasing member overlays at least one of the plurality of openings of the support cup.

Another preferred concealed sprinkler connection includes a support cup having a central hole with a plurality of openings disposed about the central hole. An escutcheon having a receiver, a rim, and a cover coupled to the rim by a thermally responsive material is engaged with the support cup to define a housing for a fire protection sprinkler such that the cover conceals the sprinkler. A preferred push-to-connect fitting has a tubular member for connection to a pipe. The tubular member includes an exterior surface and an inner surface that defines an internal conduit. A seal member and a retaining ring are disposed within the internal conduit for forming a fluid tight sealing grip about the sprinkler body. A releasing member translates with respect to the tubular member to disengage the grip of the retaining ring about the outer encasing surface of the body. The releasing member overlays at least one of the plurality of openings of the support cup when the supported cup is disposed about the fire protection sprinkler that ns received in the internal conduit of the tubular member.

Preferred embodiments of a method of fire sprinkler protection include providing a fire protection sprinkler having a body defining an inlet and an outlet with a passageway extending between the inlet and the outlet along a longitudinal axis. The provided sprinkler has a deflector supported by the body and spaced from the outlet. The provided body has an outer encasing surface surrounding at least a portion of the passageway having an axial length in the direction of the longitudinal axis to define a first contact zone. The preferred method includes axially translating the sprinkler along the first contact zone within a push-to-connect fitting in which the push-to-connect fitting that includes a tubular member with an end for connection to a pipe. The tubular member includes an exterior surface and an inner surface with the inner surface defining an internal conduit that receives the body of the sprinkler. The preferred fitting includes a seal member and a retaining ring disposed within the internal conduit of the tubular member. The seal member forms a fluid tight seal about the first contact zone with the retaining ring engaged in a grip about the first contact zone to form an adjustable seal and grip about the body of the sprinkler outer encasing surface along the first contact zone. A preferred releasing member of the fitting translates with respect to the tubular member to disengage the grip of the retaining ring about the first contact zone of the sprinkler body. The preferred method includes axially translating an escutcheon having a receiver and a rim surrounding the fire protection sprinkler. The receiver preferably defines a second contact zone for adjusting a deflector-to-rim distance between the rim of the escutcheon and the deflector of the sprinkler.

In a preferred method of recessed sprinkler installation, a sprinkler connected to a tubular member of a push-to-connect fitting is centered within an annular receiver of an escutcheon. The preferred method includes traversing an annular aperture between the fitting and the receiver wall with a releasing member of the push-to-connect fitting. A preferred method of providing a recessed sprinkler includes providing a sprinkler assembly and distributing the sprinkler assembly for recessed installation with a preferred push-to-connect fitting. The provided sprinkler assembly includes a fire protection sprinkler having a body defining an inlet and an outlet with a passageway extending between the inlet and the outlet along a longitudinal axis. A deflector is supported by the body and spaced from the outlet with the body having an outer encasing surface surrounding at least a portion of the passageway. The provided assembly includes an escutcheon having a receiver and a rim with the receiver surrounding the fire protection sprinkler to define an annular aperture between the receiver and the sprinkler. A preferred push-to-connect fitting is provided that includes a tubular member with an end for connection to a pipe, an exterior surface and an inner surface with an internal conduit that receives the body of the sprinkler. A seal member and a retaining ring is disposed within the internal conduit with the seal member forming a fluid tight seal about the encasing surface of the sprinkler body. The retaining ring is engaged in a grip about the outer encasing surface of the body. A preferred releasing member translates with respect to the tubular member to disengage the grip of the retaining ring about the outer encasing surface of the body. The releasing member has a portion that radially traverses the aperture and contacts the receiver of the escutcheon.

A preferred method of operating a push-to-connect fitting about a fire protection sprinkler. The method preferably includes forming a fluid tight seal and grip about a sprinkler body of a fire protection sprinkler in an internal conduit of a push-to-connect fitting extending along a longitudinal axis. The preferred method also includes axially translating a releasing member secured to the peripheral surface of the push-to-connect fitting along the longitudinal axis to release the fluid tight seal and grip about the sprinkler body.

A method of fire sprinkler protection comprising: providing a fire protection sprinkler having a body extending along a longitudinal axis defining a body length, the body having an outer encasing surface extending axially over at least a portion of the body length, the body having an inlet and an outlet with a passageway extending along the longitudinal axis between the inlet and the outlet to define a nominal K-factor and K-factor-to-body length ratio ranging from 3.3:1 to 1.3:1, the fire protection sprinkler including a deflector supported by the body and spaced from the outlet; and providing a sprinkler assembly with the fire protection sprinkler assembled within a push-to-connect fitting including: locating the sprinkler body within an internal conduit of a tubular member of the push-to-connect fitting; forming a fluid tight seal along the encasing surface with a seal member of the push-to-connect fitting located within the internal conduit of the tubular member; gripping the encasing surface with a retaining ring disposed within the internal conduit of the push-to-connect fitting; and releasing the grip by translating a releasing member axially with respect to the tubular member.

Another preferred method of providing a concealed sprinkler includes providing a sprinkler assembly including: a fire protection sprinkler having a body defining an inlet and an outlet with a passageway extending between the inlet and the outlet, a deflector supported by the body and spaced from the outlet with the body having an encasing surface surrounding at least a portion of the passageway. The provided sprinkler assembly includes a support cup having a central hole with a plurality of openings disposed about the central opening with the sprinkler body disposed through the central hole such that the cup surrounds the body of the sprinkler. An escutcheon having a receiver, a rim, and a cover coupled to the rim by a thermally responsive material is provided with the receiver engaged with the support cup to define a housing for the sprinkler deflector with the cover concealing the deflector. A preferred push-to-connect fitting is provided having a tubular member with an exterior surface and an inner surface that defines an internal conduit that receives the body of the sprinkler. The preferred push-to-connect fitting includes a seal member and a retaining ring disposed within the conduit to form a fluid sealing grip about the encasing surface of the body. The push-to-connect fitting includes a releasing member that translates with respect to the tubular member to disengage the retaining ring grip about the encasing surface of the body. The releasing member preferably overlays the plurality of openings of the support cup. The method preferably includes distributing the concealed sprinkler assembly for connection to a firefighting fluid supply pipe located in the confined area with the preferred push-to-connect fitting. A preferred method of concealed sprinkler installation preferably includes centering a sprinkler connected to a tubular member of a push-to-connect fitting within an annular receiver of an escutcheon engaged with a supporting cup having a plurality of openings centered about the fire protection sprinkler. The preferred method includes overlaying the plurality of openings with a releasing member of the push-to-connect fitting.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
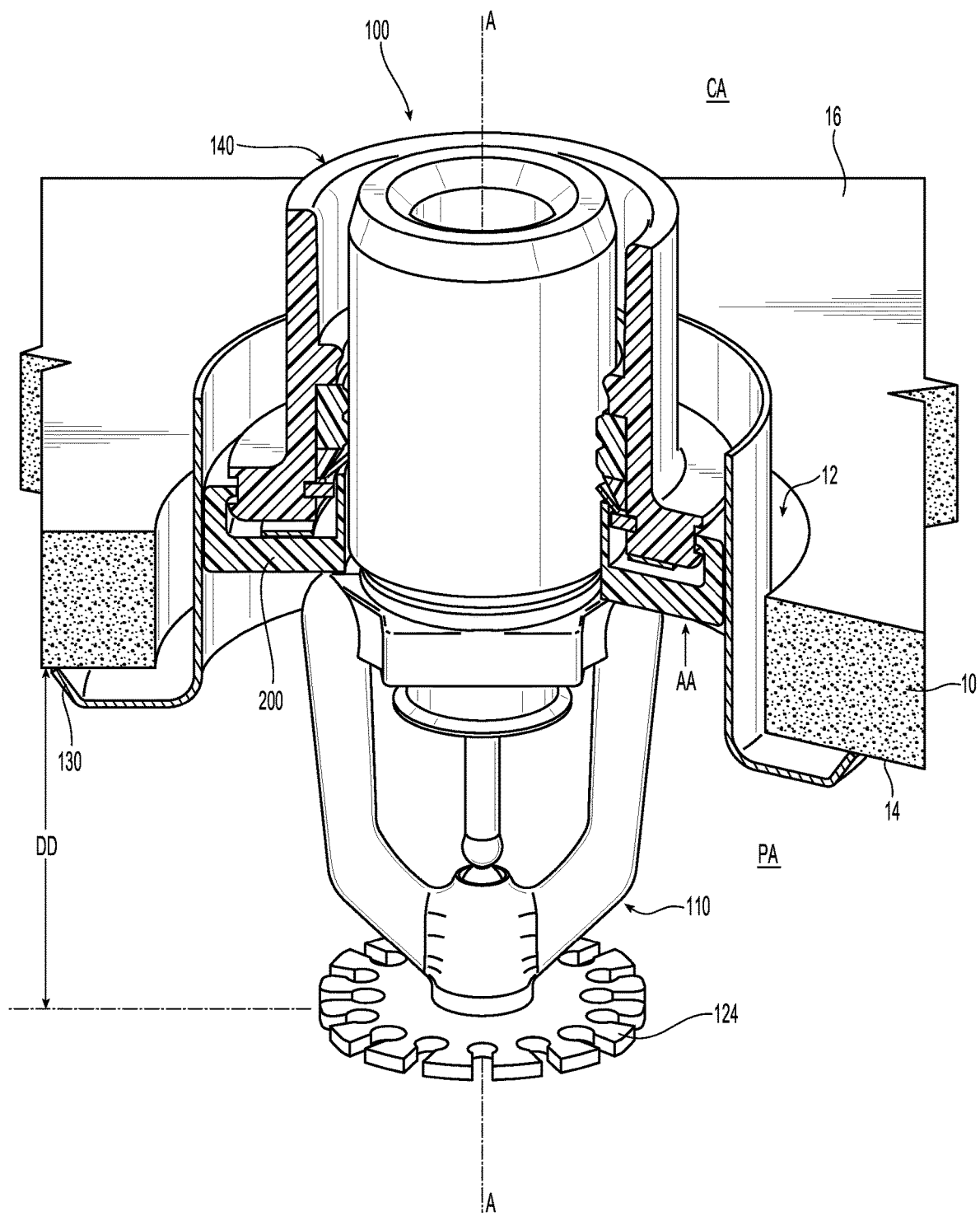
FIG. 1 is a perspective cross-sectional view of a first embodiment of a preferred recessed sprinkler assembly.

Shown in FIG. 1 is a preferred recessed sprinkler assembly 100 for the protection of an area, i.e., the protection area PA. The sprinkler assembly 100 is mounted to a barrier 10, such as for example, a ceiling barrier 10, through a through hole opening 12 and located proximate a mounting surface 14 of the ceiling barrier 10 for connection to a firefighting fluid supply pipe or pipe fitting (not shown) in the confined area or space CA to which the hack surface 16 of the ceiling barrier is exposed. The preferred recessed sprinkler assembly 100 includes a fire protection sprinkler 110 connected to the fluid supply piping or fitting by a preferred threadless connection fitting, i.e., a preferred "push-to-connect" fitting 140. More particularly, the sprinkler 110 is inserted and threadlessly pushed into the fitting 140 which forms a fluid tight seal and grip connection about the sprinkler 110. Operation of the push-to-connect fitting 140 allows for the sprinkler 110 to be adjusted to locate a fluid distribution deflector 124 of the sprinkler 110 in an operative position relative to the mounting surface 14 to define a deflector-to-mounting surface DD or other installation structures.

The recessed assembly 100 includes a preferred escutcheon 130 centered about the sprinkler 110 and more preferably centered about the push-to-connect fitting 140. As described herein, the preferred push-to-connect fitting 140 includes a releasing member 200 to release the grip about the sprinkler 110. The releasing member 200 preferably traverses the annular space AA between the sprinkler 110 and the inner surface of the escutcheon 130. In the preferred recessed arrangement, the releasing member 200 continuously circumscribes the sprinkler 110 and provides for a concealment element which covers the confined area CA from view from the perspective of the protection area PA. In another preferred aspect, the releasing member 200 forms a contact engagement with the inner surface of the escutcheon 130 that preferably adjustably and completely supports the escutcheon 130 to locate the escutcheon 130 in a desired location relative to the sprinkler 110, the deflector 124 and/or the mounting surface 14.

Figure 2A:
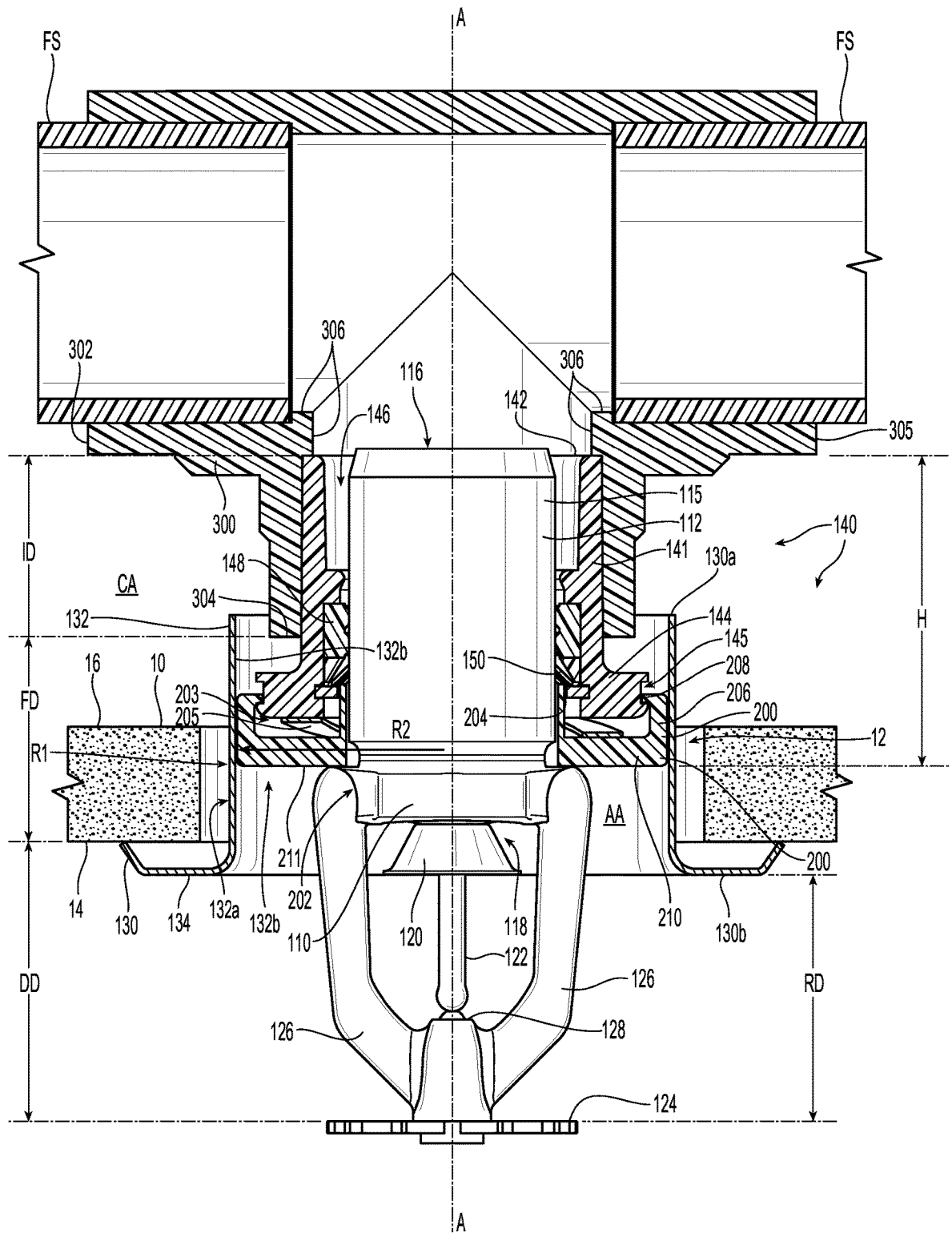
FIGS. 2A-2B are cross-sectional views of two embodiments of the recessed sprinkler assembly of FIG. 1.

Shown in FIG. 2A is one preferred recessed installation in which the preferred push-to-connect fitting 140 is inserted in and depends from a tee fitting 300 in the firefighting fluid supply piping running in the concealed area CA above the ceiling barrier 10. The pipe fitting 300 defines a pipe fitting-to-mounting surface distance FD measured from the end face of the pipe fitting to the mounting surface 14 of the barrier 10. For preferred installations and assemblies, the supply piping and pipe fittings are constructed from thermoplastic material and more preferably constructed from Chlorinated Poly (Vinyl Chloride) (CPVC) material suitable for use in fire sprinkler systems. Alternatively, the supply pipe or fittings can be formed from metallic material, such as for example, steel or brass, etc.

The push-to-connect fitting 140 are preferably constructed from similar materials. Moreover, the push-toconnect fitting 140 is preferably inserted and affixed within the receiving portion or receptacle of the pipe fitting 300 by appropriate chemical cementing used in CPVC fire sprinkler piping. Generally, the pipe fittings 300 includes a first pipe end 302 for connection to a fluid supply pipe and at least a second pipe end 304 with an internal flow path connecting the first and at least second pipe ends 302, 304. Each of the pipe ends 302, 304 have an internal surface and a shoulder 306 preferably formed therein circumscribing the flow path to define a receptacle at the pipe end 302, 304 having an insertion depth ID from the pipe end 302, 304 to the internal shoulder 306 at which pipe ends and the preferred push-to-connect fitting 140 can be inserted into the fitting 300. For preferred push-to-connect fittings 140 described herein defining an assembly height H that is preferably no more than 175% of the insertion depth ID. As a tee fitting, the pipe fitting 300 can include more than two pipe ends with receptacles thrilled therein and can include a third pipe end 305 with a receptacle formed therein. Alternatively, the pipe fitting 300 can be embodied as an elbow or any other type of fitting for connecting fluid supply piping to the preferred connection fitting 140.

The fire protection sprinkler 110 of the assembly 100 has a body 112 that includes an internal surface extending along a longitudinal axis A-A defining an internal passageway having an inlet 116 and an outlet 118. The body 112 includes an outer or encasing surface 115 which surrounds at least a portion of and more preferably circumscribes the internal surface and the internal passageway. The fluid distribution deflector 124 is preferably axially spaced from the outlet 118 and supported by the body 112. As shown, the deflector 124 is preferably secured to a pair of frame arms 126 which depend from the sprinkler body 112. As shown, the frame arms 126 locate the deflector 124 at the desired fixed axial distance from the outlet 118. In an alternate arrangement show in FIG. 10, the frame arms can provide for a "drop down" arrangement in which the arms deploy from an unactuated concealed position to an actuated deployed position.

The escutcheon 130 includes a cylindrical receiver 132 for receiving the sprinkler 110 and the push-to-connect fitting 140. The cylindrical receiver 132 is preferably annular and more preferably a circular cylindrical wall having an outer surface 132a defining an outer radius R1 for insertion within the through hole 12 of the ceiling barrier 10. In the preferred recessed arrangement, the circular cylindrical receiver 132 has an inner surface 132b that defines an inner radius R2 sized to be disposed about and in supporting contact with the releasing member 200 of the connection fitting 140. The receiver 132 preferably surrounds the sprinkler 110 to define the annular aperture AA between the receiver 132 and the sprinkler 110. The escutcheon 130 has a first end 130a and a second end 130b with a rim 134 preferably formed about the second end 130b. The receiver 132 is preferably supported by the releasing member 200 between the first and second ends 130a, 130b of the escutcheon 130 to adjustably locate a rim 134 of the escutcheon 130 axially with respect to the mounting surface 14 of the barrier 10 and/or the deflector 124 of the sprinkler 110. The rim 134 limits the axial insertion of the cylindrical receiver 132 in the through hole 12 and forms a preferred surface contact engagement with the mounting surface 14 of the ceiling barrier 10. The rim 134 preferably continuously circumscribes the through hole 12 at the mounting surface 14. In a preferred configuration, the rim 134 is formed integrally with the cylindrical receiver 132 and is circular. The rim 134 can form alternate geometries provided it can form the preferred surface contact engagement and limit insertion of the cylindrical receiver 132.

The preferred push-to-connect fitting 140 is generally tubular with one end having an exterior surface preferably for connection to the fluid supply pipe or fitting and an opposite end with an interior surface for receipt of the fire protection sprinkler 110. The preferred push-to-connect fitting 140 includes a tubular member 141 having the exterior surface disposed within the end of a pipe fitting. In the preferred recessed installation for example, shown in FIG. 2A, the end of the pipe fitting 300 can be located in the annular aperture between the receiver 132 and the tubular member 141.

Figure 4:
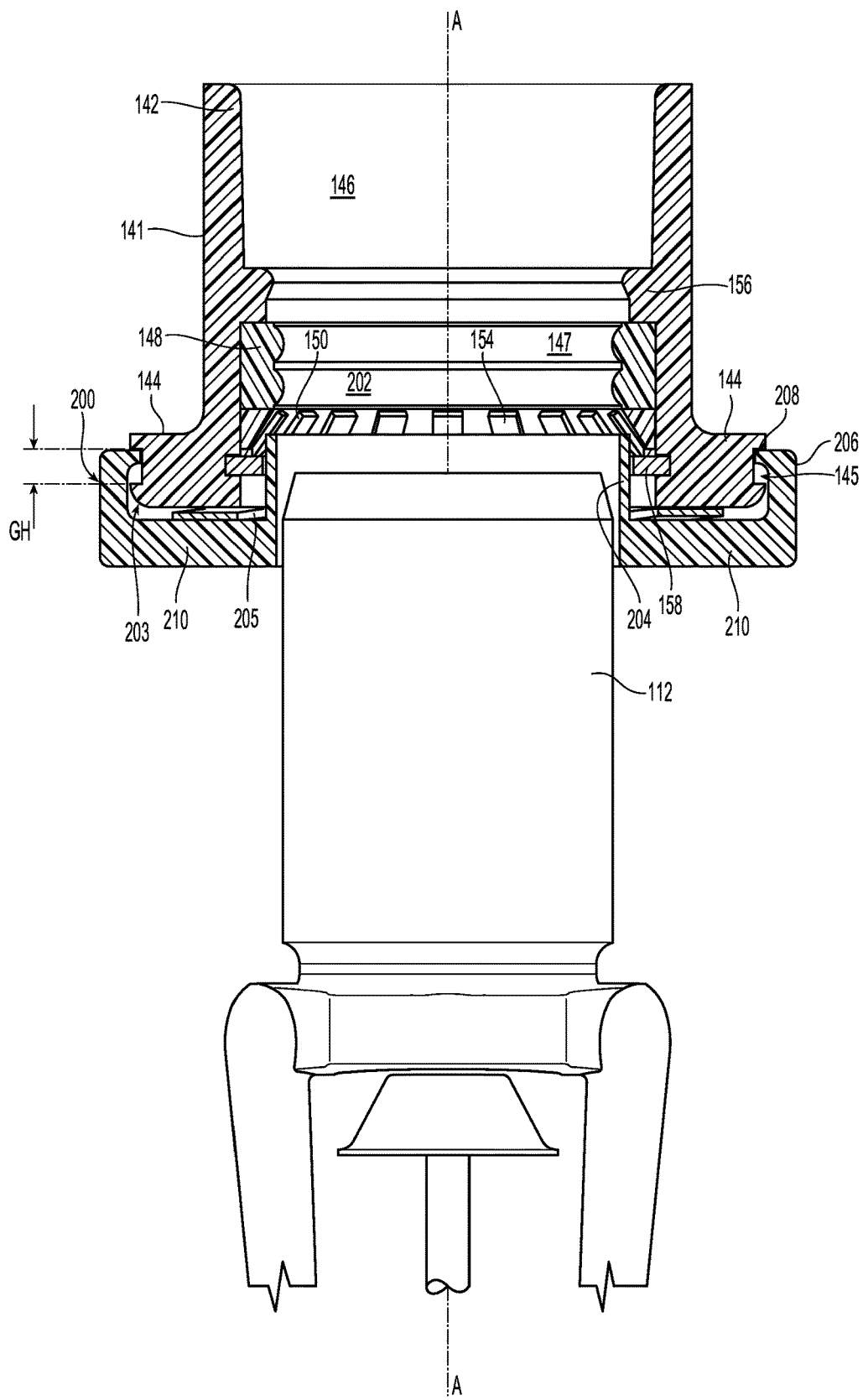
FIG. 4 is a cross-sectional view of a preferred embodiment of a connection fitting for use in the assembly of FIG. 1 with a sprinkler body released.

The tubular member 141 has an internal surface defining an internal conduit 146 housing internal components for coaxial receipt and threadless retention of the fire sprinkler 110. The tubular member 141 has a first end 142 and a second end 144 with the internal conduit 146 extending from the first end to the second end for receipt of the sprinkler body 112. Disposed within the internal conduit 146 are one or more internal annular seal member(s) 148 to contact the encasing surface 115 and form a fluid tight seal about the sprinkler body 112. A retaining ring 150 is disposed preferably adjacent the annular seal member 148. The preferred retaining ring 150 includes a group of angularly disposed gripping fingers or prongs 154, as seen in FIG. 4, which bend or splay outward upon insertion of the sprinkler body 112. The prongs 154 then resist and preferably frictionally contact and grip the encasing surface 115 of the sprinkler body 112 and resist the slide of the sprinkler 110 out of the push-to-connect fitting 140 against the weight of the inserted sprinkler 110 and/or or fluid force delivered to the sprinkler 110.

In order to release the sprinkler 110 from the preferred fitting 140 for removal or adjustment, the prongs 154 of the retention ring 150 must be outwardly displaced to release their grip on the sprinkler 110. Coupled to the tubular member 141 and more preferably coupled to the exterior or periphery of the tubular member 141 at its second end 144 is the releasing member 200 which can translate in the axial direction with respect to the tubular member 141. A central portion of the releasing member 200 extends into the conduit 146 at the second end 144 of the tubular member 141. Upon axial translation of the releasing member 200 in the direction preferably toward the first end 142 of the fitting 140, the central portion of the releasing member translates within the conduit 146 to contact and outwardly displace the prongs 154 thereby releasing the sprinkler 110.

Figure 3:
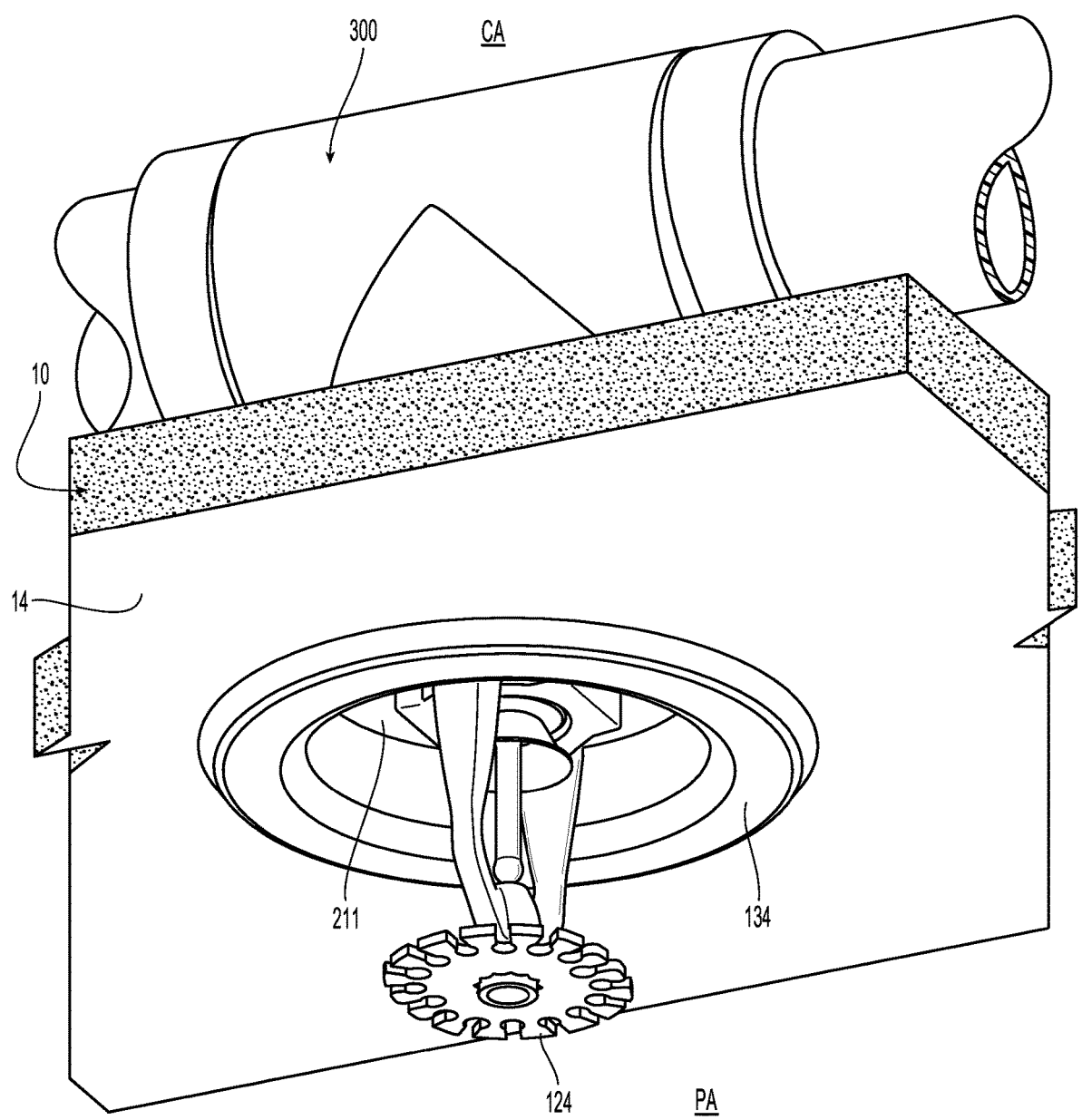
FIG. 3 is another perspective view of the recessed sprinkler assembly of FIG. 2A.

A preferred embodiment of the releasing member 200 is preferably configured as a disc-like member having a central opening 202 for alignment with the internal conduit 146 of the tubular member 141 and sized to receive the body 112 of a sprinkler 110. Forming the central opening 202 is an inner wall 204 that is inserted into the conduit 146 of the tubular member 141 and an outer wall 206 that circumscribes and preferably engages the periphery of the tubular member 141 to secure the releasing member 200 to the tubular member 141. The outer wall 206 is radially spaced from the inner wall 204 with one or more radially extending portions 210 interconnecting and more preferably integrally formed with the inner and outer walls 204, 206. As previously noted, with the sprinkler body 112 coaxially inserted in the tubular member 141, the inner surface 132b of the receiver 132 forms an annular space or aperture AA with the sprinkler 110. The one or more radially extending portion(s) 210 traverse the aperture AA with the peripheral exterior surface of the outer wall 206 in supporting contact with the inner surface 132b of the receiver 132. In a preferred embodiment the releasing member 200, the traversing portion 210 is continuously circumscribed about the central axis A-A. In such a configuration, the traversing portion 210 provides for the concealment portion, cover surface or end face 211 of the releasing member 200 to cover and more particularly conceal the confined area CA from the perspective of the protection area PA, as seen in FIG. 3. In a preferred aspect, the traversing portion 210 of the releasing member 200 traverse the annular aperture AA between the tubular member 141 and the inner surface 132b of the receiver 132.

In a preferred method of axially adjusting the location of the sprinkler and its deflector 124, a hand or tool is inserted into the annular aperture AA to push and translate the releasing member 200 in the direction preferably toward the first end 142 of the tubular member 141. As a result, the inner wall 204 of the releasing member 200 contacts the retaining ring 150 and splays apart the prongs 154 which releases the grip on the sprinkler body 112. With the sprinkler body 112 free, the installer/adjuster can rotate and/or axially locate the sprinkler 110 and its deflector 124 at an operative position with respect to either the mounting surface 14 or the rim 134 of the escutcheon, provided the seal(s) 148 form the fluid tight seal about the sprinkler body 112. With the sprinkler 110 properly located, the releasing member 200 is translated toward the second end 144 of tubular member 141 thereby permitting the prongs 154 to reengage and grip the encasing surface 115 of the sprinkler body 112 and hold the sprinkler 110 in position.

Figure 2B:
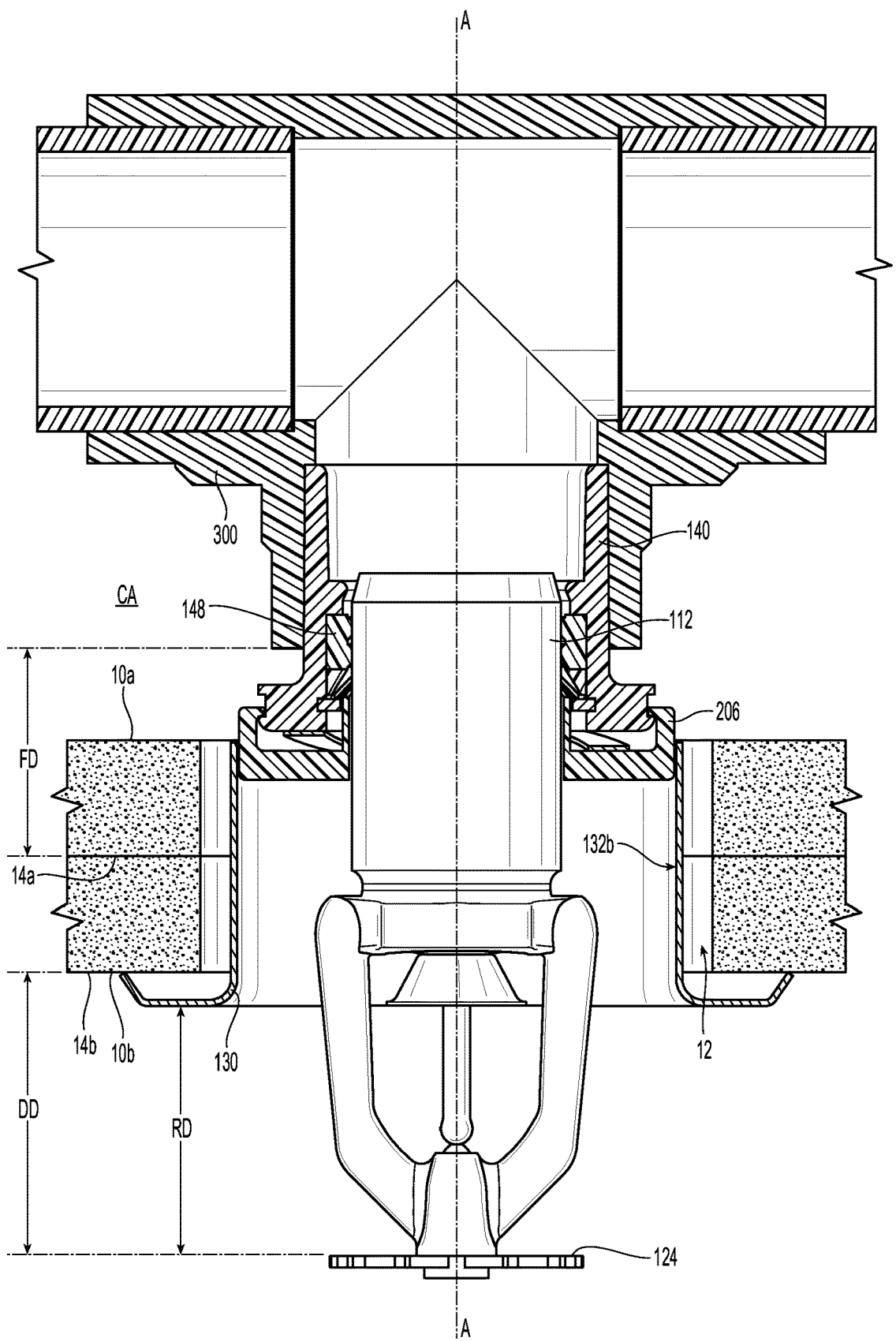

The preferred recessed sprinkler assembly also allows the escutcheon 130 to be adjustably located. Shown in FIG. 2B is an alternate arrangement in which a second barrier 10b overlays the first barrier 10a with the through hole opening 12 extending through each of the first and second barriers 10a, 10b with the supply pipe fitting 300 in the confined area CA defining the same fitting-to-mounting distance FD with respect to the first mounting surface 14a of FIG. 2A. As with the prior installation, the sprinkler 110 can be axially translated with respect to the push-to-connect fitting 140 by push-release action to axially locate the sprinkler 110 within the connection fitting 140 and define the same desired deflector-to-mounting surface distance DD with respect to the second mounting surface 14b of the added second barrier 10b. Additionally, the contact engagement between the peripheral surface of the outer wall 206 of the releasing member 200 and the inner surface 132B of the receiver 132 allows the escutcheon 130 to be axially translated and adjusted with respect to the releasing member 200 to locate the rim 134 against the second mounting surface 14b of the second barrier 10b. Accordingly, the adjustability of the sprinkler 110 and the escutcheon 130 with the preferred fitting and releasing member assembly 140, 200 allows for maintenance of a desired deflector-to-rim distance RD despite the addition of the second barrier 10b and the constant fitting-to-mounting distance FD with respect to the first mounting surface 14a. Preferred embodiments of the sprinkler assembly 100 provide for one or more complimentary contact surfaces or contact zones over which the sprinkler 110 and/or the escutcheon 130 can be axially translated and adjusted to provide for the desired relative spacing between the deflector 124, the escutcheon rim 134 and/or other mounting surfaces or structures.

Figure 5:
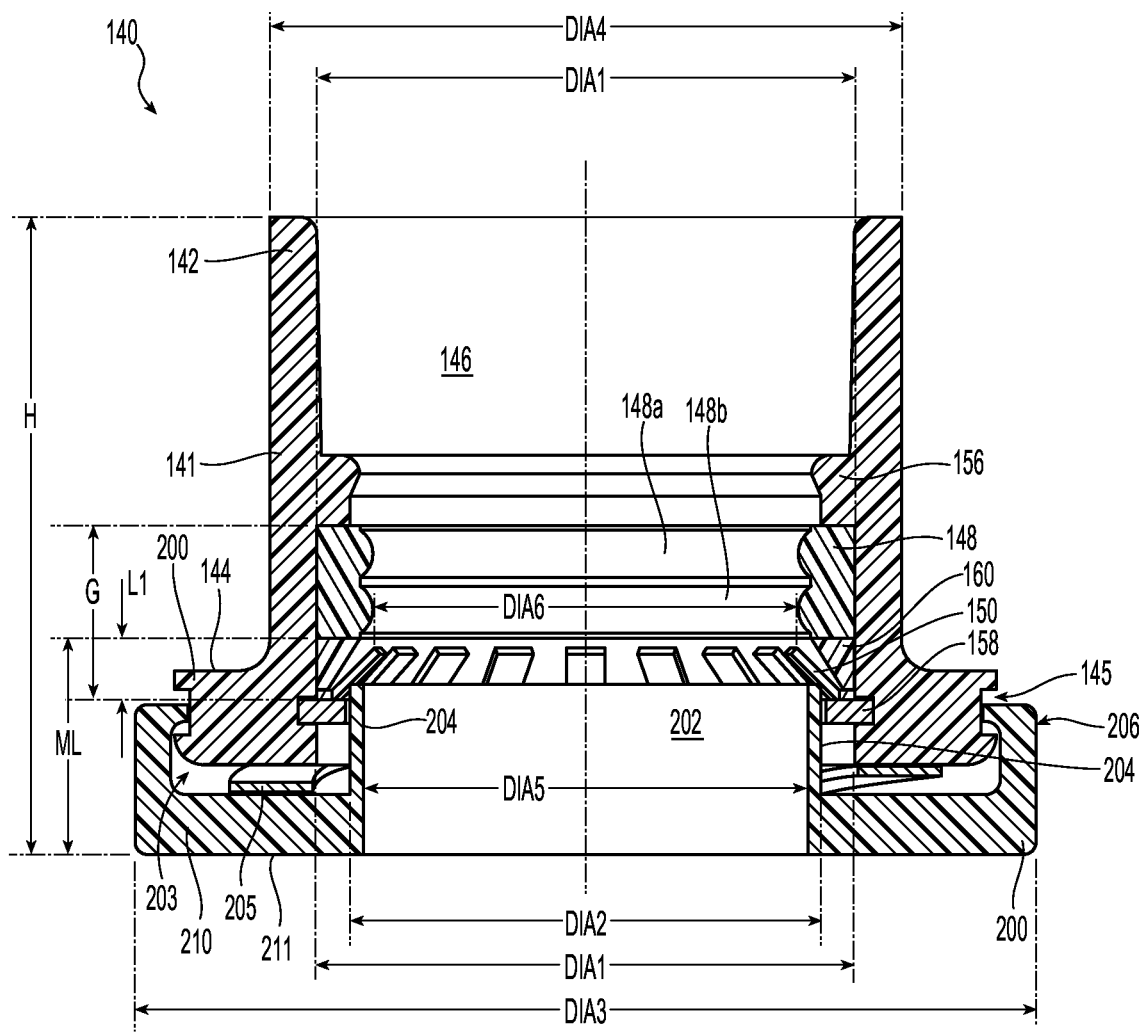
FIG. 5 is a cross-sectional view of the preferred connection fitting used in the assembly of FIG. 1.
Figure 6:
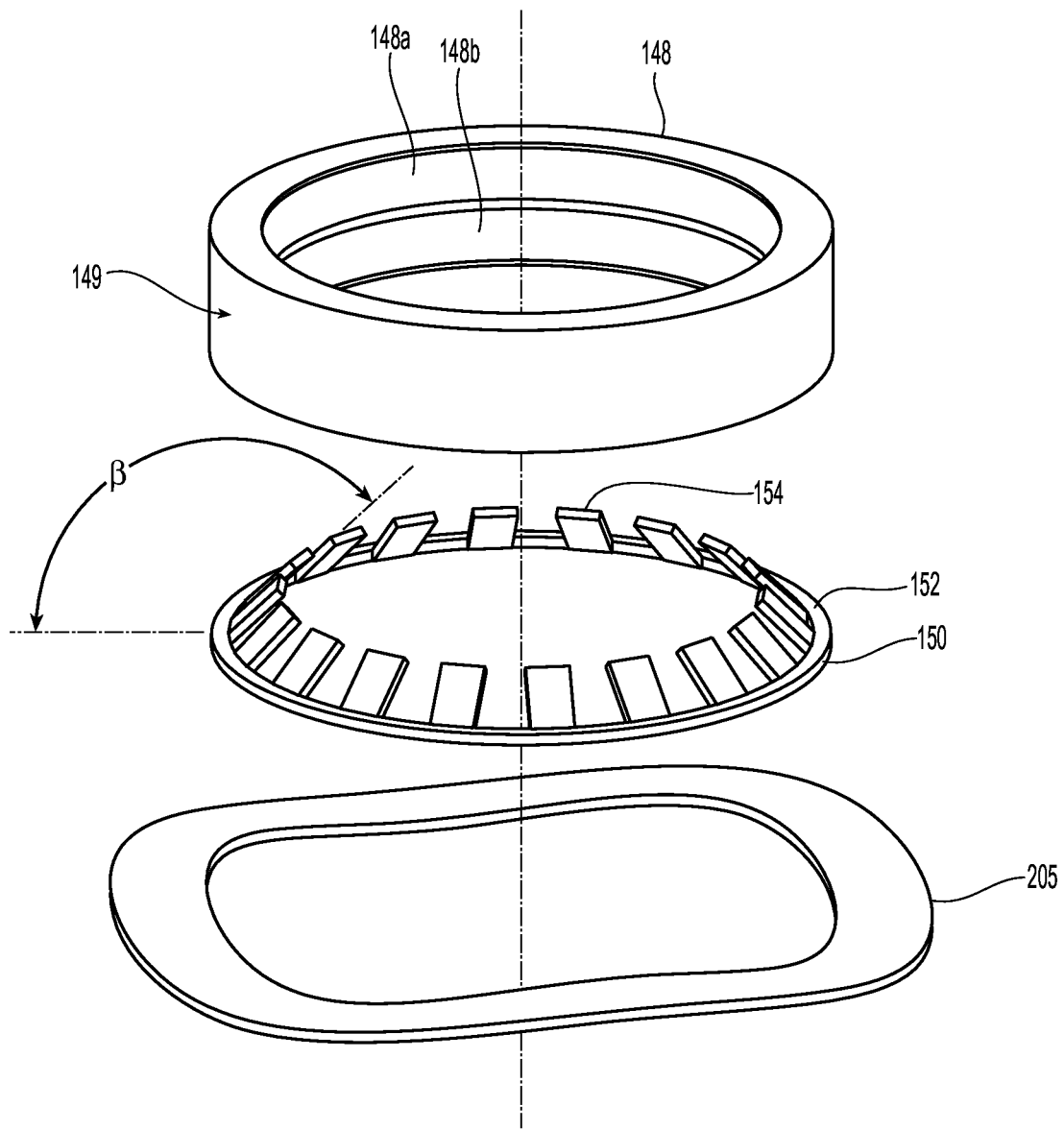
FIG. 6 is an exploded view of internal components for use in the connection fitting of FIG. 5.

FIGS. 4-6 show details and manner of operation of the preferred push-to-connect fitting 140 and its internal sealing and gripping components. FIG. 4 shows the releasing member 200 fully translated toward the first end 142 of the fitting 140 with the sprinkler body 112 released from the grip of the retaining ring 150. As previously described, the push-to-connect fitting 140 is preferably embodied as an insert fitting that is preferably affixed within the end receptacle of a tee, elbow, union or other pipe fitting. Accordingly, tubular member 141 and its first end 142 are a preferably circular cylindrical having a preferably constant outer diameter sized for insertion into a pipe fitting. More particularly, the tubular member has a constant outer diameter over a substantial axial length of the tubular member 141 for close fit within the receptacle of the pipe fitting, for example, as seen in FIG. 2A. The constant outer diameter is sufficiently sized and tolerance for affixing within the receptacle of the pipe fitting using, for example, chemical bonding or welding. Thus, the exterior surface of the tubular member 141 provides for a preferred securement portion to affix the push-to-connect fitting 140 to a pipe fitting. Preferably, the outer diameter of the securement portion is constant over an axial length that is at least equal to the insertion depth ID of the pipe fitting into which the securement portion is inserted.

Referring again to FIGS. 4 and 5, the second end 144 of the tubular member 141 is preferably enlarged as compared to the securement portion to form a limit or stop the insertion of the tubular member 141 within the pipe fitting. The second end 144 is preferably formed as an annular flange 144 integral with the rest of the tubular member 141, The flange 144 is sized to abut or engage the end of the pipe or pipe fitting into which the tubular member 141 is inserted, as seen for example, in FIG. 2A. The annular flange 144 is formed with a central opening axially aligned and in communication with the internal conduit 146 of the tubular member 141.

As shown, the outer or exterior surface of the tubular member 141 is preferably configured at its second end 144 to retain the releasing member 200. More particularly, the outer surface of the flange 144 preferably includes a peripheral and preferably circumferential groove 145 to engage the preferred releasing member 200. The outer wall 206 of the releasing member preferably includes a projection 208 and more preferably an annular projection 208 that is directed radially inward and engages the peripheral groove 145 of the tubular member 141 to secure the releasing member 200 to the tubular member 141. The groove 145 additionally defines a groove height GH which provides sufficient relative axial travel of the releasing member 200 in the direction of the first end 142 of the tubular member 141 to splay the gripping fingers 154 of the retaining ring 150 and release the sprinkler 110. Alternatively to a continuous circumferential groove 145, the groove 145 can discontinuous having an alternate geometry provided the releasing member 200 has a complimentary projection 208 to engage and translate within the groove 145.

To prevent inadvertent translation of the releasing member 200, for example, when adjusting the escutcheon 130, and thereby maintain the grip of the retaining ring 150 about the sprinkler body 112, the push-to-connect fitting 140 includes an arrangement to resist or control relative translation between the releasing member 200 and the tubular member 141. The preferred formation of the releasing member 200 provides an annular channel 203 between the inner and outer walls 204, 206 with the annular flange 144 of the tubular member housed within the channel 203. Preferably disposed within the annular channel 203 is a resistance element 205, such as for example, a leaf spring, coil spring, pliable member, ball detent and spring arrangement or any other resilient member or arrangement member which preferably acts to control the relative axial translation of the releasing member with respect to the tubular member 141 and its contact with the retaining ring 150. More specifically, the resistance element 205 controls translation by providing a force sufficient to translate or bias the releasing member 200 away from the first end 142 of the tubular member and out of contact with the retaining ring 150, yet apply a sufficiently small force that can be overcome by a hand or tool operation to translate the releasing member 200 toward the first end 142 of the tubular member 141. Alternatively or additionally, the resistance element 205 can form a positive lock between the releasing element 205 and the tubular member 141. FIG. 4 shows the resistance of element 205 overcome by a translation force by hand or tool (not shown); and FIG. 5 shows the resistance element 205 in its uncompressed and housed positon within the annular channel 201 FIG. 6 shows a perspective view of the resistance element 205.

Shown in FIG. 5 is the preferred assembled push-to-connect fitting 140 in cross-section. Disposed within the conduit 146 is the annular sealing member 148 and retaining ring 150 preferably respectively positioned within the fitting tube 141 against a first annular seat 156 and a second annular seat 158. By locating the sealing member 148 within the internal conduit 146 of a tubular member that is externally cemented, the sealing member 148 and the sealing area is protected from the chemical cement. Both or either of the first and second seat 156, 158 can be integrally formed with the internal surface of the fitting 140 or alternatively be embodied as separate annular member disposed and affixed along the conduit 146 to provide the seat. An annular wedge 160 surrounds the retaining ring 150 and is disposed between the first seat 156 and the retaining ring 150 to limit the outward flex of the fingers 154. Accordingly, in the preferred embodiment of the fitting 140, the first seat 156 and second seat 158 are axially spaced apart to define a gap region G for housing the annular sealing member and retaining ring 148, 150.

By preferably coupling the releasing member 200 to the periphery of the tubular member 141, the insertion depth from the end face 211 of the translating release member 200 to the seal 148, i.e., the "mechanism length" ML can be minimized and is believed to be comparatively smaller than other insertion depths of known push-on type threadless fittings. Preferably, the mechanism length ML is preferably no more than 40% (0.4:1) of the total axial height H of the assembled connection fitting 140 and more preferably no more than 35%. In a preferred embodiment of the push-to-connect fitting, the total axial height ranges from 1.8-1.9 inches and the mechanism length ML preferably ranges from 0.4-0.5 inches. Minimizing the insertion depth at which the sprinkler body 112 engages the seal 148 maximizes the amount of the encasing surface 115 i.e., the contact zone of the sprinkler body, for seal formation. The increased contact zone for sealing increases the range of axial adjustment for the sprinkler 110 with respect to the rim 134 or mounting surface 14. Moreover, by preferably coupling the releasing member 200 to the periphery of the tubular member 141, the minimum deflector-to-mounting surface distance can also be minimized. DD. With reference to FIG. 2B, the minimum deflector-to-mounting surface DD can be preferably determined by the contact between the sprinkler frame arms 126 and the releasing member 200.

Because the outer wall 206 of the releasing member 200 engages and secures to the outer peripheral surface of the tubular member 141, the axial gap G between the seats 156, 158 of the fitting 140 can also be minimized because the axial gap G does not need to provide space for the projection 208 or other securement for the releasing member 200. Moreover, the peripheral securement of the releasing member 200 provides that inner wall 204 of the releasing member 200 can be otherwise freely centered in the central opening of the retaining ring seat 158, as seen for example in FIG. 5, which further simplifies the assembly. In a preferred aspect, where the axial spacing between the annular seal member 148 and the retaining ring seat 158 define an axial distance L1 for housing the retaining ring 150, the axial distance L1 is preferably no more than 25% of the mechanism length ML.

The conduit 146 defines an internal diameter DIA1 that is sufficiently large to receive the sprinkler body 112 and the inner wall 204 of the releasing member 200. In a preferred aspect, the inner wall 204 of the releasing member 200 defines an outer diameter DIA2 that is less than the inner diameter DIA 1 of the conduit 146 and less than the central opening of the annular seat 158. Other than its contact with the retaining ring 150, the inner wall 204 of the releasing member 200 is preferably free of contact within the conduit 146 even when a sprinkler 110 is secured therein. Accordingly, the connection fitting 140 does not need any internal space for any internal supporting structure to affix the releasing member 200 to the fitting 140.

The push-to-connect fitting 140 defines other preferred dimensional relationships to facilitate its simplified assembly and operation as a connector between the received sprinkler 110 and the pipe fitting. For example, the releasing member 200 and its outer wall 206 define an outer diameter DIA3 that is sufficiently large to support an escutcheon and overlay or traverse apertures and openings as described herein. The smaller preferred securement portion of the tubular member 141 and its first end 142 define the preferred constant outer diameter to allow for insertion and securement of the connection fitting 140 within a pipe fitting. A preferred ratio of the releasing member 200 outer diameter DIA3 to securement portion outer diameter DIA4 is 1.2:1. In an exemplary embodiment, the releasing member 200 outer diameter DIA3 is 1.9 inches and the securement portion at the first end 142 of the tubular member 141 defines an outer diameter DIA4 is 1.4 inches.

The inner and outer walls 204, 206 of the releasing member 200 are preferably configured to form the preferred channel 203 and secure the releasing member 200 to the periphery of the tubular member 141 at the annular flange 144. The annular flange 144 defines a preferred outer diameter of about 1.7 inches with a peripheral annular groove 145 having a groove depth of about 0.05 inch to define a groove diameter of 1.65 inch with a preferred groove height GH of about 0.1 inch to determine the axial translation of the releasing member 200. Accordingly, the preferred annular projection 208 of the releasing member 200 extends radially inward from the periphery of the outer wall 206 to engage the peripheral groove 145. In a preferred aspect, the ratio of the outer diameters of the annular flange 144 and the larger release member 200 is about 0.9:1. The outer wall 206 is radially spaced about the inner wall 204 to define with their preferred ratio of outer diameters DIA2: DIA3. In a preferred example in which the outer wall 206 peripheral diameter DIA3 is preferably 1.9 inches and more preferably 1.875 inches, the outer diameter DIA2 of the inner wall 204 is preferably about 0.985 inch. The inner wall 204 of the releasing member 200 defines a preferred internal diameter to receive the sprinkler body 112 and in a preferred embodiment preferably defines a internal diameter DIA5 of over 0.9 inch. The first end 142 of the tubular member 141 is smaller than the annular flange 144 at the second end of the tubular member 141 for preferred insertion in a pipe or pipe fitting. In the preferred connection fitting assembly, the outer diameter DIA3 of the releasing member 200 to the outer diameter DIA4 at the first end 142 of the tubular member 141 defines a preferred ratio DIA3:DIA4 that is about 1.2:1. Accordingly, a preferred ratio of the outer diameter DIA3 of the outer wall 206 to the inner diameter DIA5 of the inner wall 204 is 2:1.

The retaining ring 150 grips the sprinkler body 112 to retain the sprinkler 110 within the connection fitting 140. Shown in FIG. 6 is the preferred retaining ring 150 having a base 152 about which the group of prongs 154 are angularly disposed. The prongs 154 bend with respect to the base 152 and more preferably are integrally formed with the base 152 with a living hinge in between that allow the fingers 154 to bend with respect to the base 152. In a preferred embodiment, the retaining ring 150 and its fingers 154 define a preferred internal diameter DIA6 of less than 0.875 inches (⅞ in.) and is preferably about 0.825 inch. In one particular preferred embodiment related to the insertion depth of the connection fitting to the seal 148, the internal diameter DIA6 of the retaining ring 150 defines a preferred ratio of mechanism length-to-minimum internal diameter ML:DIA6 that ranging from 0.5:1-0.6:1. The fingers 154 further preferably define an obtuse angle β with respect to a plane perpendicular to the longitudinal axis A-A. The obtuse angle β preferably ranges from 150° in an unloaded state to 120° in a loaded state in which the fingers 154 grip an inserted sprinkler body.

Figure 7:
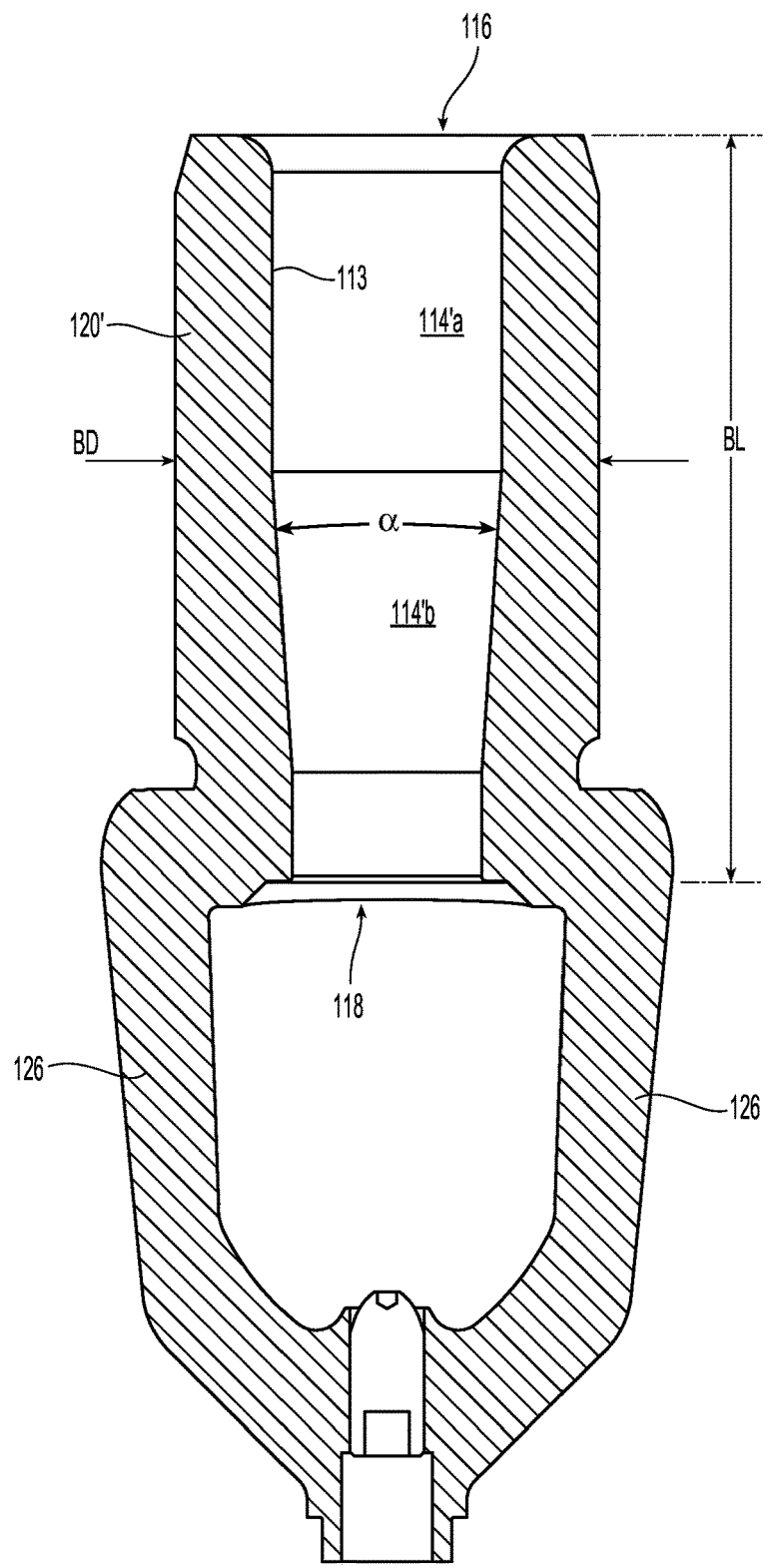
FIG. 7 is a cross-sectional view of a fire protection sprinkler frame for use in the assembly of FIG. 1.

To facilitate the adjustability of the sprinkler installation, the sprinkler body 112 and its encasing surface 115 are of a preferred axial length which can provide a contact zone over which a fluid tight seal can be formed and the deflector 124 can be properly located. Shown in FIG. 7 is a preferred sprinkler body 112' which can be formed integrally with the sprinkler frame outlet and frame arms. Alternatively, the sprinkler body 112' can be formed as a sprinkler adapter body for connection to a sprinkler frame having an outlet and frame arms. In either construction, the frame arms 126 are configured for connection to a deflector (not shown). The body 112' defines a body length BL in the axial direction and a body diameter BD which can engage the annular seal member 148 of the push-to-connect fitting 140 previously described. The body diameter BD preferably define the maximum diameter of the sprinkler body 112' and is constant over a substantial length of the body length BL. In a preferred embodiment, the body diameter BD ranges from to 0.8-1.0 inch and is more preferably 0.9 inch to 1.0 inch. Thus, for preferred embodiments of the sprinkler body, the outer diameter is slightly larger than the minimum internal diameter of the retaining ring 150.

The body length BL is preferably determined as the axial length between the inlet 116 and the outlet 118 and preferably ranges from over 1.0 inch to 2.0 inch and more preferably ranges from 1.1 inches to 1.75 inches and even more preferably ranges from 1.5-1.6 inches to provide a sufficiently long contact zone for adjustable sealing and gripping as described. The body length of the body 112 is also preferably related to the internal passageway 114 of the sprinkler 110. The nominal K-Factor provides a discharge characteristic of the sprinkler 110 and is determined by the flow of fluid in gallons per minute (GPM) through the internal passageway 114 and outlet 118 divided by a square root of pressure of water fed into the inlet end of the internal passageway in pounds per square inch gauge (psig): $Q=K\sqrt{P}$ where P represents the pressure of water fed into the inlet end of the internal passageway through the body of the sprinkler, in pounds per square inch gauge (psig); Q represents the flow of water from the outlet end of the internal passageway through the body of the sprinkler, in gallons per minute (GPM); and K represents the nominal K-factor constant in units of gallons per minute divided by the square root of pressure expressed in psig.

Preferred embodiments of the sprinkler body 112' and outlet 118 define a nominal K-factor (with the K-factor range shown in parenthesis) of less than 14.0 (13.5-14.5) $GPM/(PSI)^{1/2}$ and preferably less than 11.2 (10.7-11.7) $GPM/(PSI)^{1/2}$ such as for example, any one of 4.9 $GPM/(PSI)^{1/2}$, 4.4 $GPM/(PSI)^{1/2}$, 2.8 $GPM/(PSI)^{1/2}$. The sprinkler 110 and its internal passageway and outlet 114, 118 can be configured with smaller or larger K-factors detailed herein provided the sprinkler body can be coupled into an appropriately sized or scaled push-to-connect fittings to provide for fluid connections and sprinkler installations as described herein with the appropriate discharge characteristics tri effectively address a fire. In a preferred aspect, the body length BL preferably ranges directly with the K-factor. The sprinkler body and its internal passageway define a preferred K-factor-to-body length ratio ranging from 3.3:1 to 1.3:1. For the preferred K-Factors of 4.9 $GPM/(PSI)^{1/2}$, 4.4 $GPM/(PSI)^{1/2}$, 2.8 $GPM/(PSI)^{1/2}$, the body 112' defines preferred respective body lengths BL of 1.59 inch; 1.57 inch and 1.52 inch. With the sprinkler 110 received within the connection fitting 140 and fluid supplied to the tubular member 141, the sprinkler 110 discharges the fluid to define a rated K-factor that is at least 90% of the nominal K-factor and is more preferably 100% of the rated K-factor.

The preferred body lengths BL are longer than previously known sprinkler body lengths for similar sized K-factors. Accordingly, the internal passageways 114' of the preferred body is longer than known passageways for similar sized K-factors. As shown in FIG. 7, the internal passageway 114' includes a preferred first passageway portion 114'a of a constant diameter adjacent the inlet 116 and a second passageway portion 114'b of a variable diameter adjacent and downstream of the first passageway portion 114'a preferably adjacent the outlet 118'. The first passageway portion 114'a preferably has a greater axial length than the length of the second passageway portion 114'b and the length of the first passageway portion 114'a is preferably less than 50% of the total body length BL, preferably ranging from 35-45% of the body length and preferably about 45% of the body length BL. Accordingly, the first body portion defines a preferred body length-to-axial length ratio of 2:1-3:1. The second passageway portion 114'b is preferably defined by a narrowing taper in the direction from inlet-to-outlet. The taper can be defined by the included angle α between the converging interior surface of the sprinkler body which preferably ranges between five and twenty degrees (5°-20°) and more preferably between five and ten degrees (5°-10°) and even more preferably between seven to eight degrees (7°-8°). In addition to the first and second passageway portion 114'a, 114'b the passageway can include other portions having differentiating dimensional characteristics including different axial lengths, internal diameters and/or tapers. In a preferred embodiment of the sprinkler body 112, the internal passageway 114' includes a third portion between the first and second portion defining a variable diameter that narrows in the direction of flow, the third portion defined by an included angle that ranges from 15° to 20°.

As shown for example in FIG. 6, the annular seal member 148 preferably includes at least two sealing surfaces 148a, 148b to provide two sealing surfaces 148a, 148b preferably axially spaced apart in the seal member 148 for formation of a fluid tight seal about the sprinkler encasing surface 115 particularly under high fluid pressures, such as for example, pressures as a high as 1400 pounds per square inch (psi.), As shown in FIGS. 5 and 6, it is preferred to integrate the two sealing surfaces 148a, 148b in a single seal member 148 supported by a base 149 to facilitate easy assembly and removal by requiring only one sealing member to be inserted or extracted by hand or with an assembly tool.

Figure 8:
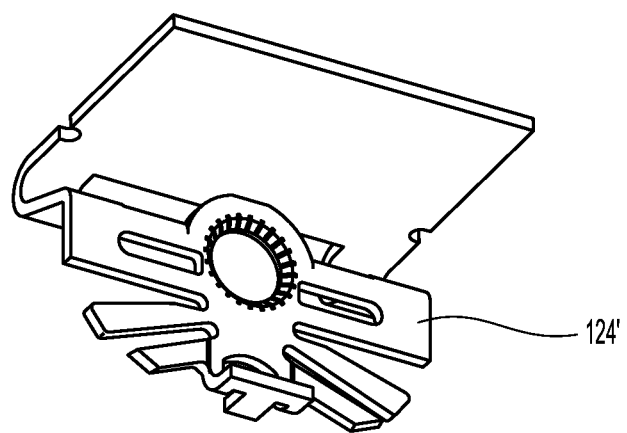
FIG. 8 show exemplary embodiments of a deflector for use in the sprinkler assembly of FIG. 1.
Figure 8:
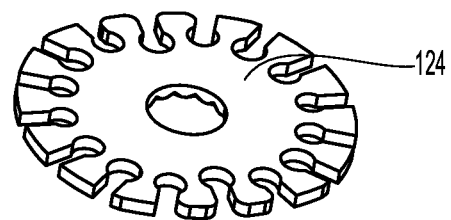
Figure 9:
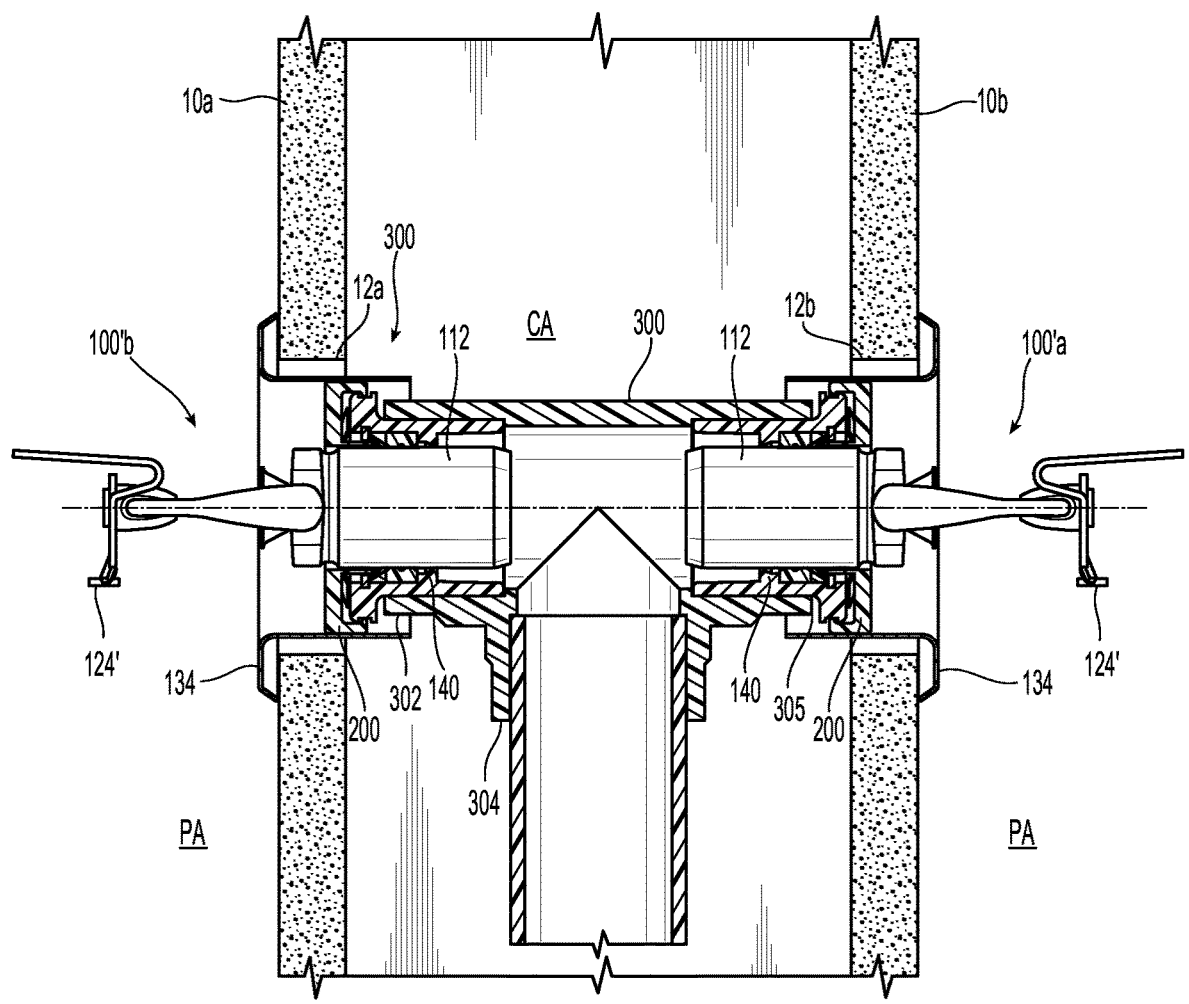
FIG. 9 is a cross-sectional view of another recessed installation using the sprinkler assembly of FIG. 1.

The prior embodiments show the fire protection sprinkler in a pendent-type recessed installation. The recessed sprinkler assembly can be alternatively installed in a sidewall or horizontally oriented installation. For example, shown in FIG. 9 are two recessed sprinkler assemblies 100'a, 100'b in a sidewall back-to-back installation arrangement. The assemblies each include a fire protection sprinkler body 112 inserted in a preferred push-to-connect fitting 140 as previously described with an appropriately configured side wall deflector 124'. Accordingly, the preferred assemblies described herein can be used with any type of deflector, such as those shown in FIG. 8, provided the deflector can be properly located from the mounting surface or escutcheon rim in order to distribute a firefighting fluid in a desired manner for effective surface wetting and/or addressing of a fire. Shown in FIG. 8 are perspective views of an exemplary sidewall deflector 124' and a flat plate pendent deflector 124.

Referring again to FIG. 9, a fluid supply pipe tee fitting 300 is located within a confined space or area CA between two spaced apart and parallel wall barriers 10a, 10b. The two axially aligned pipe ends 302, 305 of the tee fitting 300 are aligned with the through hole openings 12a, 12b formed in each of the walls 10a, 10b. The central inlet 304 of the tee fitting 300 is connected to a fluid supply pipe. Centered in each opening 12a, 12b is an escutcheon 130 with the rim 134 of the escutcheon circumscribing the openings. A preferred assembled push-to-connect fitting 140, as previously described, is inserted into each end 302, 305 of the tee fitting 300. Pushed into each connection fitting 140 is the sidewall sprinkler 110'a, 110'b about which an internal seal 148 and retaining ring 150 form a fluid tight sealing grip about the sprinkler bodies 112. Each sprinkler 110'a, 110'b is pushed into the connection fitting 140 to locate the sidewall deflector 124' at an operative distance from the rim 134 of the escutcheon to effectively protect the protection area PA.

Figure 10:
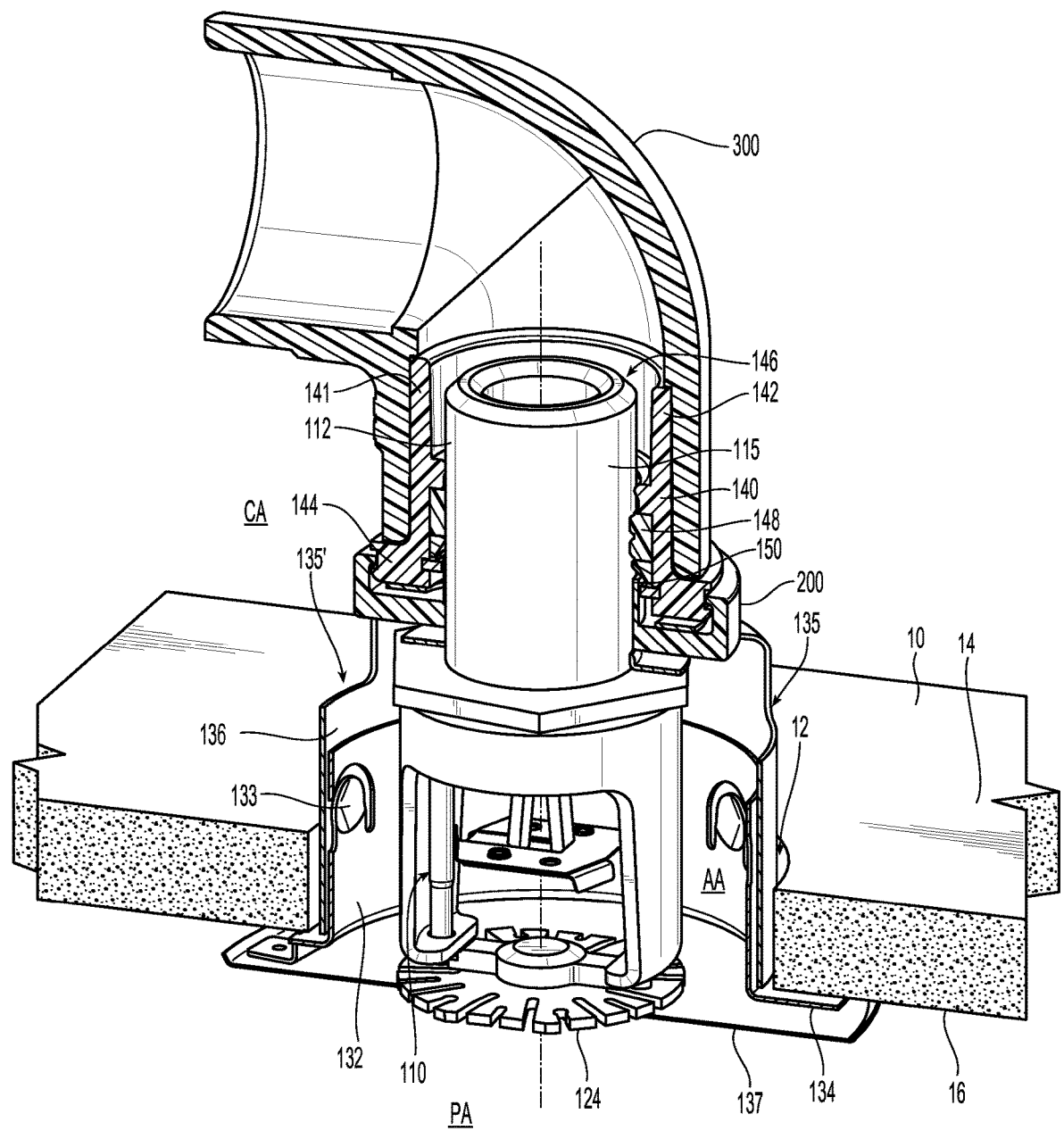
FIG. 10 is a perspective cross-sectional view of a preferred embodiment of concealed recessed sprinkler assembly.

Shown in FIG. 10 is an alternate assembly and installation in which the push-to-connect fitting 140 provide for a preferred concealed sprinkler installation. In the prior embodiments, the push-to-connect fitting 140 and its releasing member 200 are at least partially located inside of the escutcheon 130 to conceal the supply piping from view of the protective area PA. In FIG. 10, the releasing member 200 is disposed completely outside of the escutcheon 130 and is instead located completely within the concealed area CA side of the harriers 10. In the final installation, the receiver 132 of the escutcheon 130 is preferably coupled to a support cup 136 to form a housing about the sprinkler 110. The support cup 136 includes a central hole through which the sprinkler body 112 extends such that the support cup 136 rests upon the sprinkler frame with the receiver 132 of the escutcheon surrounding the sprinkler to define the aperture AA about the sprinkler 110. The support cup 136 includes one or more apertures or openings 135 about the central hole in communication with the aperture AA. The releasing member 200 overlays the one or more openings 135 of the support cup 136. The escutcheon 130 includes a rim 134 to which a cover 137 is secured by thermally responsive material for concealing the housing space within the escutcheon assembly 130'. In the event of a fire, the thermally responsive material melts permitting the cover 137 to fall away and expose the deflector 124, permitting the deflector 124 to drop for distribution of firefighting fluid discharged from the sprinkler body 112 in the protected area PA.

To form the preferred concealed installation, the enclosed fire protection sprinkler 110 and support cup 136 are inserted into the through hole 12 from the protection area PA to locate the sprinkler body within the internal conduit 146 of the tubular member 141 and engage the internal sealing member 148 and retaining ring 150 in a manner as previously described. The releasing member 200 is translated toward the first end 142 of the tubular member 141 to contact the retaining ring and allow the sprinkler body 112 to freely slide and adjust into an operative position. With the sprinkler 110 and support cup 136 installed, the releasing member 200 is returned to a position out of contact with the retaining ring 150 allowing the internal seal member and retaining ring 148, 150 to grip the sprinkler 110 with a fluid tight seal. Moreover, the releasing member 200 overlays the support cup 136 and its apertures or opening(s) 135 to obscure or cover the concealed area CA from view.

As shown, an elbow fitting 300 is located in the concealment area CA above the barrier 10 with the preferred push-to-connect 140 and releasing member 200 inserted in the receptacle at the end of the elbow 300'. The elbow 300' can be connected to a fluid supply pipe (not show) extending parallel to the mounting surface 14. The concealed area CA can be an attic space above a ceiling 10 or alternatively be located between a ceiling 10 and a floor deck (not shown) above the ceiling 10, To complete the concealed installation the escutcheon 130 is engaged with the support cup 136. The receiver of the escutcheon 130 and the support cup 136 preferably include one or more appropriately cooperating coupling structures 133, such as for example, cooperating grooves and a projections to join the two components.

The cover 137 of the escutcheon conceals the housed sprinkler 110 and the deflector 124 from view. The fire protection sprinkler 110 is shown embodied as a drop down automatic sprinkler with an axially translating deflector 124 supported in its unactuated and retracted position by the cover 137 embodied as a flat plate. In an alternative embodiment, the deflector 124 can be fixed with respect to the sprinkler body 112 and the cover 137 can be embodied as a domed cover. The sprinkler 110' is housed and centered within the housing of the support cup and escutcheon 130, 136 with the annular aperture AA sufficiently sized to access the releasing member from the rim 134 of the escutcheon and through the openings 135 of the support cup 136 using a hand or tool. To provide the desired aperture and access, the sprinkler frame arms 126 or the deflector 124 define the widest portion of the sprinkler 110 to control the annular aperture AA access. In the preferred embodiments, where the fire protection sprinkler or deflector defines a maximum width within the housing, the releasing member 200 defines a diameter that is greater than the maximum width of the sprinkler components.

The fire protection sprinklers 110 of the various embodied assemblies are preferably automatic sprinklers, but can alternatively be normally open. As seen in FIG. 2A, the preferred automatic sprinkler 110 includes a seal member 120 disposed in the outlet 118 supported in place by a thermally responsive element 122. In a preferred embodiment, the thermally responsive element 122 is a glass bulb trigger supported between the seal member 120 and a deflector 124. In the embodiment shown, the compression screw 128 engaged in a threaded bore of the frame arms loads the seal member 120 through the thermally responsive element 122 to form a fluid tight seal in the outlet 118. With the seal member 120 supported and loaded, the seal member inhibits fluid flow through the passageway 114 of the body 112. Alternative thermally responsive elements 122 can include a strut and lever with thermally responsive link, as seen for example in FIG. 10.

The preferred methods of sprinkler installation and assembly can also include providing and distribution of the preferred recessed and/or concealed sprinkler assemblies or components thereof. The distribution of the assemblies can include the process of packaging, inventorying or warehousing and/or shipping of the assemblies and/or its associated methods of assembly configuration and/or use. The shipping can include individual or bulk transport of the sprinkler assemblies to an end or downstream user. The avenues of distribution of preferred products and services can include the transfer of the preferred sprinkler assemblies from one party to another party. For example, the preferred sprinkler assembly or components thereof can be distributed from a designer to a manufacturer, manufacture to a supplier, and/or a supplier to a contractor/installer of fire protection systems.

White the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A sprinkler assembly comprising:
a fire protection sprinkler having a body defining an inlet and an outlet with a passageway extending between the inlet and the outlet along a longitudinal axis, a deflector supported by the body and spaced from the outlet, the body having an outer encasing surface surrounding at least a portion of the passageway having an axial length in the direction of the longitudinal axis to define a first contact zone;
an escutcheon having a receiver and a rim surrounding the fire protection sprinkler to define an aperture between the receiver and the sprinkler, the receiver having a surface defining a second contact zone; and
a push-to-connect fitting including:
a tubular member with an end for connection to a pipe, the tubular member including an exterior surface and an inner surface, the inner surface defining an internal conduit that receives the body of the sprinkler;
a seal member and a retaining ring disposed within the internal conduit, the seal member forming a fluid tight seal about the first contact zone with the retaining ring engaged in a grip about the first contact zone to form an adjustable seal and grip about the outer encasing surface of the body of the sprinkler along the first contact zone; and
a releasing member that translates with respect to the tubular member to disengage the grip of the retaining ring about the first contact zone, the second contact zone of the escutcheon translating with respect to the tubular member to define an adjustable deflector-to-rim distance between the rim of the escutcheon and the deflector of the sprinkler.

2. The sprinkler assembly of claim 1, wherein the receiver of the escutcheon has an inner surface defining the second contact zone is in sliding surface contact with a portion of a peripheral surface of the releasing member.

3. The sprinkler assembly of claim 1, wherein the receiver of the escutcheon has an outer surface defining the second contact zone in in contact with a support cup disposed about the sprinkler body.

4. The sprinkler assembly of claim 3, wherein the retaining ring includes a plurality of prongs radially disposed about a base to grip the sprinkler body, the releasing member including an inner wall defining a central opening for receipt of the sprinkler body, the releasing member being translatable with respect to each of the sprinkler body and the fitting such that the inner wall contacts the retaining ring to splay the plurality of prongs and release the grip about the sprinkler body.

5. The sprinkler assembly of claim 4, wherein the releasing member includes an outer wall circumferentially spaced about the inner wall, the escutcheon being in adjustable supporting surface contact engagement with the outer wall.

6. The sprinkler assembly of claim 5, wherein the outer wall of the releasing member and the receiver of the escutcheon are in sliding surface contact engagement for adjustment of the deflector-to-rim distance.

7. The sprinkler assembly of claim 4, further comprising a resistance member to resist relative translation between the releasing member and the tubular member.

8. The sprinkler assembly of claim 1, wherein the releasing member traverses the aperture and is in supporting contact with the receiver.

9. The sprinkler assembly of claim 1, further comprising a supporting cup disposed about the sprinkler body, the escutcheon being engaged with the supporting cup.

10. The sprinkler assembly of claim 9, wherein the supporting cup has a central opening disposed over the sprinkler body such that the supporting cup circumscribes the sprinkler, the receiver including a projection engaged with an inner surface of the support cup, the supporting cup having a plurality of apertures overlaid by the releasing member, the releasing member being accessible through the plurality of apertures to adjust the fluid tight seal and grip about the sprinkler body and the deflector-to-rim distance.

11. The sprinkler assembly of claim 10, wherein the retaining ring includes a plurality of prongs radially disposed about a base to grip the sprinkler body, the releasing member including an inner wall defining a central opening for receipt of the sprinkler body, the releasing member being translatable with respect to each of the sprinkler body and the fitting so that the inner wall contacts the retaining ring and splays the plurality of prongs and releases the grip about the sprinkler body.

12. The sprinkler assembly of claim 11, wherein the releasing member includes an outer wall circumferentially spaced about the inner wall, the inner wall being disposed in the internal conduit of the tubular member, and the outer wall engaged with a peripheral surface of the tubular member to secure the releasing member to the tubular member.

13. The sprinkler assembly of claim 12, wherein the peripheral surface includes a groove, the outer wall including a projection engaged within the groove.

14. The sprinkler assembly of claim 13, wherein the push-to-connect fitting includes a first end and a second end, the second end including an annular flange formed about the second end of the fitting with the groove formed about a peripheral surface of the annular flange.

15. The sprinkler assembly of claim 14, wherein the groove defines a groove height and an amount of axial of relative translation between the tubular member and the releasing member.

16. The sprinkler assembly of claim 15, wherein the inner and outer wall define a channel therebetween to house the annular flange, a resisting element disposed in the channel to resist the relative translation between the releasing member and the tubular member.

17. The sprinkler assembly of claim 9, further including a cover coupled to the rim of the escutcheon by a thermally responsive material.

18. The sprinkler assembly of claim 1, wherein the connection end of the tubular member is disposed within a pipe fitting receptacle.

19. A method of providing fire sprinkler protection, the method comprising:

providing a fire protection sprinkler having a body defining an inlet and an outlet with a passageway extending between the inlet and the outlet along a longitudinal axis, a deflector supported by the body and spaced from the outlet, the body having an outer encasing surface surrounding at least a portion of the passageway having an axial length in the direction of the longitudinal axis to define a first contact zone;

axially translating the sprinkler along the first contact zone within a push-to-connect fitting, the push-to-connect fitting including:

a tubular member with an end for connection to a pipe, the tubular member including an exterior surface and an inner surface, the inner surface defining an internal conduit that receives the body of the sprinkler;

a seal member and a retaining ring disposed within the internal conduit, the seal member forming a fluid tight seal about the first contact zone with the retaining ring engaged in a grip about the first contact zone to form an adjustable seal and grip about the outer encasing surface of the body of the sprinkler along the first contact zone;

a releasing member that translates with respect to the tubular member to disengage the grip of the retaining ring about the first contact zone; and axially translating an escutcheon having a receiver and a rim surrounding the fire protection sprinkler, the receiver defining a second contact zone for adjusting a deflector-to-rim distance between the rim of the escutcheon and the deflector of the sprinkler.

* * * * *